United States Patent [19]

Tejima et al.

[11] Patent Number: 5,274,406
[45] Date of Patent: Dec. 28, 1993

[54] IMAGE PROJECTING DEVICE

[75] Inventors: Yasuyuki Tejima; Kazushi Yoshida, both of Tokyo, Japan; Moriyasu Shirayanagi, Tucson, Ariz.

[73] Assignee: Asahi Kogaku Kogyo Kabushiki Kaisha, Tokyo, Japan

[21] Appl. No.: 793,543

[22] Filed: Nov. 18, 1991

Related U.S. Application Data

[63] Continuation of Ser. No. 656,686, Feb. 19, 1991, abandoned, which is a continuation of Ser. No. 291,955, Dec. 29, 1988, abandoned.

[30] Foreign Application Priority Data

Dec. 29, 1987 [JP] Japan .................. 62-335674

[51] Int. Cl.$^5$ .............................. G03B 21/00
[52] U.S. Cl. ........................... 353/70; 353/69; 353/98
[58] Field of Search ............ 353/69, 70, 78, 79, 353/98, 99, 74, 76, 77; 358/237, 239, 231, 60

[56] References Cited

U.S. PATENT DOCUMENTS

| | | | |
|---|---|---|---|
| 3,173,985 | 3/1965 | Wendel | 353/98 |
| 3,253,505 | 5/1966 | Miller | 353/70 |
| 3,357,299 | 12/1967 | Noble | 353/69 |
| 3,975,095 | 8/1976 | Minoura et al. | 353/69 |
| 4,012,125 | 3/1977 | Hart . | |
| 4,173,399 | 11/1979 | Yevick | 353/78 |
| 4,257,694 | 3/1981 | Reinhard | 353/78 |
| 4,439,027 | 3/1984 | Shioda et al. | 353/77 |
| 4,578,710 | 3/1986 | Hasegawa | 353/77 |
| 4,672,458 | 6/1987 | McKechnie | 358/237 |
| 4,674,850 | 6/1987 | Blom . | |
| 4,708,435 | 11/1987 | Yata et al. | 353/77 |
| 4,875,064 | 10/1987 | Umeda et al. | 353/78 |

FOREIGN PATENT DOCUMENTS

| | | | |
|---|---|---|---|
| 62-31838 | 2/1987 | Japan . | |
| 0787746 | 12/1957 | United Kingdom | 353/69 |

*Primary Examiner*—William A. Cuchlinski, Jr.
*Assistant Examiner*—William C. Dowling
*Attorney, Agent, or Firm*—Sandler, Greenblum & Bernstein

[57] ABSTRACT

An image projecting device includes structure for correcting the distortion of an image and/or the defocusing of an image, which will be caused in a situation in which the optical axis of a projection lens is inclined with respect to a screen. The device includes a screen positioned along a predetermined plane, a source for emitting light which forms an optical image on the screen, with the optical axis of the source and the screen plane being inclined with respect to each other so that they are not optically normal with respect to each other, and a reflecting surface for reflecting light from the source towards the screen along a separate optical axis. The reflecting surface is optically positioned between the screen and the source and has a predetermined three-dimensional shape which is adapted to correct for trapezoidal distortion of the optical image projected onto the screen.

30 Claims, 34 Drawing Sheets

F I G. 12E
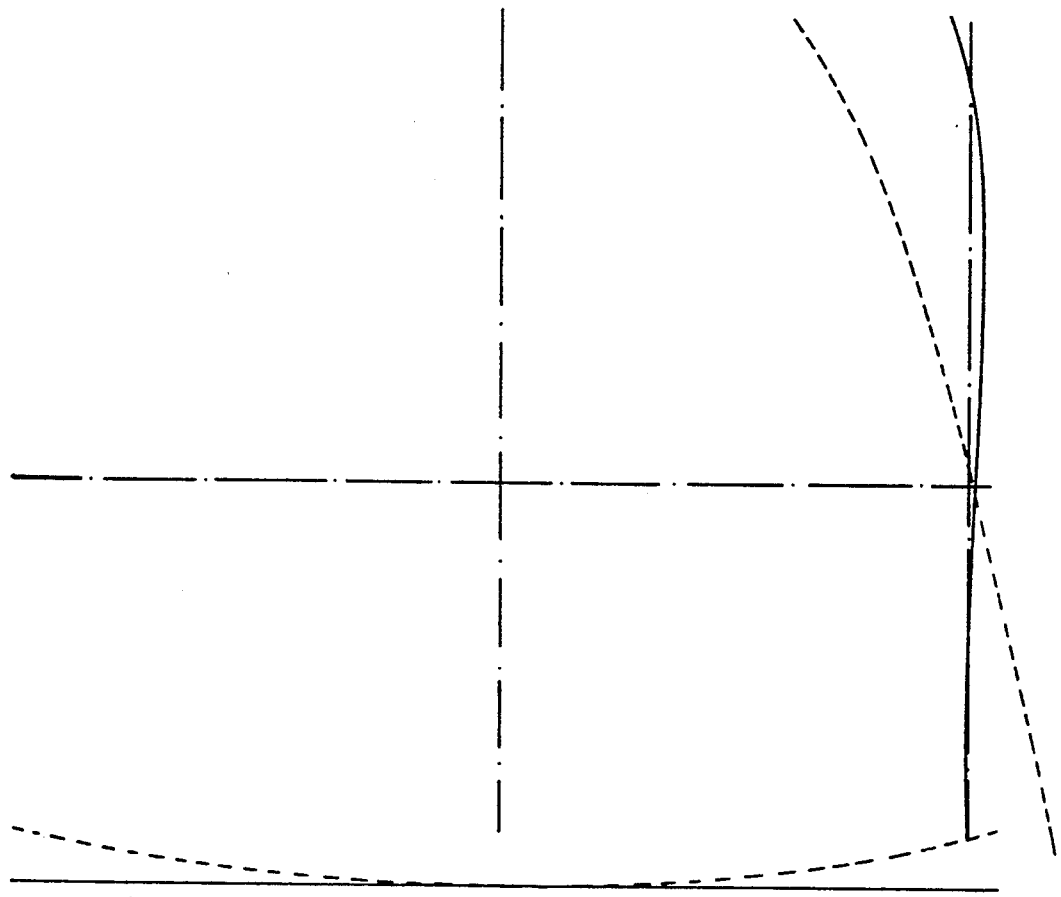

IMAGE PROJECTING DEVICE

This application is a continuation of application Ser. No. 07/656,686, filed Feb. 19, 1991, abandoned, which is a continuation of prior application Ser. No. 07/291,955 filed Dec. 29, 1988, now abandoned.

BACKGROUND OF THE INVENTION

This invention relates to an image projector which enlarges and projects an image appearing on a CRT (cathode ray tube), etc., which is defined herein as an image source, through projection lenses onto a rear projection type screen.

This type of image projector is disclosed, for example, in Japanese Patent Provisional Publication Sho62-31838, in which a video projector is illustrated in FIG. 1. As shown, this prior art projector has a CRT 2, on which an optical image appears, a projector lenses 3, and a reflecting mirror 4 within a casing 1. On one side of the casing 1, a rear projection type screen 5 is arranged.

In the above described projector, the reflecting mirror 4 is formed to have a function of a convex mirror, with a diverging effect that permits the screen 5 to be brought in the proximity of the reflecting mirror 4, thereby making the overall thickness of the projector smaller. However, in the above described projector, an angle $\theta$ between the reflecting mirror 4 and the screen 5 must be 45 degrees, which causes a limit to making the size thin.

In order to further reduce the size, the above angle $\theta$ has to be made smaller. In this connection, theoretically, a projector as illustrated in FIG. 2, can be constructed wherein a chart surface 10 of the image source 2 and a projector lenses 20 are arranged to be inclined with respect to a reflecting surface 30.

Assume an orthogonal coordinate with the point of intersection 0 between an optical axis 11 of the projection lenses 20 and the reflecting surface 30 as being the origin. Let the axis passing through the point of intersection 0 and crossing the reflecting surface 30 at right angles be an x-axis; then let the crossed line between the surface including optical axis 11 and the x-axis and the reflecting surface 30 be a y-axis, and the axis crossing both x and y axes at right angles be a z-axis. Namely, the reflecting surface 30 coincides with y-x plane and FIG. 2 shows the cross-section along the x-y plane. In this reference example, the chart surface 10 is set up perpendicular with respect to optical axis 11.

Hereunder, an example is described with reference to actual numerical values. The optical system given in the example below is intended to magnify an optical image by 12 times the original formed on the chart surface 10 of the image source 2 and project it on the screen 40 using the optical image with a height of +/−22.860 mm in the y direction and a height of +/−30.480 mm in the z direction on the chart surface 10.

All the angles in the following description concern those on this x-y plane; the clockwise direction with respect to the reference direction is set to be "−".

The projector lenses 20 employed in the projector illustrated in FIG. 2 may comprise, for example, a 4-group/6-leaf lens system as illustrated in FIG. 3, the configulational relation of which is indicated in Table 1.

TABLE 1

| | | | |
|---|---|---|---|
| $R_1 = 66.838$ | $D_1 = 7.340$ | $N_1 = 1.72342$ | $UH_1 = 25.00$ |
| $R_2 = -351.917$ | $D_2 = 0.200$ | $N_2 = 1.00000$ | $UH_2 = 25.00$ |
| $R_3 = 33.209$ | $D_3 = 9.700$ | $N_3 = 1.72000$ | $UH_3 = 20.00$ |
| $R_4 = -118.902$ | $D_4 = 2.500$ | $N_4 = 1.80518$ | $UH_4 = 20.00$ |
| $R_5 = 26.650$ | $D_5 = 13.270$ | $N_5 = 1.00000$ | $UH_5 = 15.00$ |
| $R_6 = -27.832$ | $D_6 = 2.500$ | $N_6 = 1.62004$ | $UH_6 = 15.00$ |
| $R_7 = 189.738$ | $D_7 = 9.240$ | $N_7 = 1.72000$ | $UH_7 = 20.00$ |
| $R_8 = -39.088$ | $D_8 = 0.200$ | $N_8 = 1.00000$ | $UH_8 = 25.00$ |
| $R_9 = -212.500$ | $D_9 = 5.450$ | $N_9 = 1.72342$ | $UH_9 = 25.00$ |
| $R_{10} = -71.903$ | | | $UH_{10} = 25.00$ |

In Table 1, as indicated in FIG. 3, R1, R2, ... R9 and R10 are the radius of curvature surfaces from the side of the chart surface 10, and UH1, UH2, ... UH9 and UH10 are the apertures thereof, D1, D2, ... D8 and D9, are the distances between respective curvature surfaces, and N1, N2 ... N8 and N9 are the refractive indexes of the medium within the range corresponding to the respective distances.

In this specification, the projection lenses with a focal distance of 75 mm formed as above is defined as an actual lens in order to distinguish it from an ideal lens to be described later.

In FIG. 2, $\theta_1$ is the tilt angle of the reflecting surface 30 with respect to the screen 40, and $\theta_2$ is the tilt angle of the optical axis 11 with respect to the x-axis. The distance from the chart surface 10 along the optical axis 11 to the first curvature surface of the projection lens 20 is d1. The distance from the final curvature surface of the lens 20 to the origin 0 is d1. The distance from the origin 0 along the reflecting light pass 12 of the optical axis 11 of the reflecting surface 30 to the screen 40 is d3.

The specifications in case that an actual lens is used are as per the values given in Table 2. The light path in this case is as shown in FIG. 4A and the distortion and the spot diagram of the image projected on the screen 40 are as shown in FIG. 4B.

TABLE 2

| | |
|---|---|
| $\theta_1 = 37.000°$ | $d_1 = 66.506$ mm |
| $\theta_2 = 37.000°$ | $d_2 = 661.550$ mm |
| | $d_3 = 225.000$ mm |

FIG. 4A shows five main beams with heights in the y direction on the chart surface 10 of −22.860 mm, −11.430 mm, 0.000 mm, 11.430 mm and 22.860 mm, respectively, with respect to the origin 0, and two adjacent beams each for respective main beams.

FIG. 4B shows a case where a 6×8 mesh is set up so that the vertical and horizontal pitch is 7.62 mm on the chart surface 10 and this mesh is projected on the screen 40 via the above-mentioned optical system: it is desirable to bring it to the 6×8 reference mesh (shown by a broken line in the figure) as close as possible so that the chart surface 10 is enlarged by 12 times or so that the vertical and horizontal pitch becomes 91.44 mm. In the optical system shown in this example, as the value of $\theta$ is large, it is possible to almost completely coincide the mesh to be actually projected with the reference mesh.

The spot diagram is shown as a collection of points in the figure. In this figure, simulation is done using 100 beams per spot diagram projected from the same location on the chart surface 10 and the spot scale is indicated as 10 times the scale of the mesh. As the spot state on the right half region is symmetrical with that on the left half, illustration on the left half is omitted.

Next, the thickness of the projector is explained. The thickness is given as the distance between the screen 40 and the lower end of the reflecting surface 30 as a reference. Now, let the lower end of the reflecting surface 30 be point of an intersection P (refer to FIG. 4A) between the main beam emitted from y = −22.880 mm on the chart surface 10 and the reflecting surface 30, if an imaginary line passing through this P and crossing with the screen 40 at right angles is set up, the screen 40 and the distance between the point of intersection of this imaginary line and P are used as a reference with which to indicate the thickness of the projector. In this specification, this distance is defined as a thickness index $d_T$.

In the above example, $d_T = 356.531$ mm.

In the example above, an actual lens is used as the projection lenses 20. For reference, design values and performance, when a so-called ideal lens, which does not cause aberration is employed are given below.

Table 3 indicates each tilt angle, and distance. The definition of codes are the same as those in the above example. The thickness of an ideal lens is assumed to be 0 (Zero).

The light path is as given in FIG. 5A and the distortion and the spot diagram of the projected image are given in FIG. 5B.

TABLE 3

| | |
|---|---|
| $\theta_1 = 37.500°$ | $d_1 = 81.250$ mm |
| $\theta_2 = 37.500°$ | $d_2 = 755.000$ mm |
| | $d_3 = 220.000$ mm |

The mesh as projected on the screen 40 completely coincides with the reference mesh. FIG. 5B is a simulational diagram of spots corresponding to 100 beams emitted from a single point on the chart surface 10 in the same manner as that in FIG. 4A. As an ideal lens is employed, the spots converge completely on a single point on the screen 40 and are not indicated as diverging spots in the figure unlike that in FIG. 4B.

The thickness index in this configuration will be $d_T = 356.531$ mm the same as in the above example.

In the example mentioned above, however, if the tilt angle $\theta_1$ is less than 37 degrees, image performance will degrade.

A modified example is explained hereunder with reference to FIG. 8. Although FIG. 8 is a configurational diagram to explain the first embodiment of this invention, as the basic configuration is the same as that for the modified example, this figure is used to explain the configuration in the following example. The same symbols are used for the parts identical to those in FIG. 2 and the definitions of $\theta_1$, $\theta_2$, d1, d2 and d3 shown in the diagram are the same as those in the example mentioned above.

In the example below, the chart surface 10 is inclined with respect to the surface crossing the optical axis 11 at right angles, the tilt angle of which is defined as $\theta_3$. In this way, by tilting the chart surface 10 counterclockwise with respect to the above-mentioned surface crossing at right angles, the distance between the projection lenses 20 and the imaging point of beams reflected by the upper part of the reflecting mirror 30 can be made longer than the distance between the projection lenses 20 and the imaging point of beams reflected by the center of the reflecting surface 30. At the same time, the distance between the projection lenses 20 and the imaging point of beams reflected by the lower part of the reflecting surface 30 can be made shorter than the distance between the projection lenses 20 and the imaging point of beams reflected by the center of the reflecting surface 30, whereby the variance of the imaging point corresponding to each point on the chart surface 10 from the screen 40 can be corrected.

In the configuration in FIG. 8, each tilt angle, and distance when an actual lens (lens shown in Table 1) is used are as per Table 4. In this case, the optical path is as shown in FIG. 6A and the distortion and the spot diagram is shown in FIG. 6B.

Thickness index $d_T = 282.617$ mm.

TABLE 4

| | |
|---|---|
| $\theta_1 = 16.499°$ | $d_1 = 66.506$ mm |
| $\theta_2 = 56.500°$ | $d_2 = 606.550$ mm |
| $\theta_3 = 4.000°$ | $d_3 = 280.000$ mm |

Each tilt angle and distance when the above-mentioned ideal lens is used as the projection lens 20 for the configuration in FIG. 8 are as shown in Table 5. In this case, the optical path is as shown in FIG. 7A and the distortion and the spot diagram are as shown in FIG. 7B. The spot diagram can be made complete just as in FIG. 5B.

Thickness index $d_T = 286.965$ mm.

TABLE 5

| | |
|---|---|
| $\theta_1 = 17.499°$ | $d_1 = 81.250$ mm |
| $\theta_2 = 57.500°$ | $d_2 = 695.000$ mm |
| $\theta_3 = 4.000°$ | $d_3 = 280.000$ mm |

Although the mechanical configuration can be made thinner if the angle between the screen 40 and the reflecting surface 30 is made smaller, the image distortion as projected on the screen 40 will be large as shown in FIG. 7B with the result that the system cannot withstand practical use.

As is apparent from the above explanations, in the case where the optical axis of the projection lenses is inclined with respect to the screen, the image projection performance is considerably reduced due to the distortion of the image and/or defocusing of the image caused by the inclination of the optical axis of the projection lenses.

SUMMARY OF THE INVENTION

It is therefore an object of the invention to provide an image projecting device capable of projecting an optical image onto a screen without considerably reducing the image projecting performance, even if an optical axis of projection lenses is inclined with respect to the screen.

According to this invention, there is provided an image projecting device comprising:

an image source for forming an optical image;

projection lenses for projecting the optical image formed by the image source onto a screen, the optical axis of the projection lenses being inclined with respect to the screen; and means for correcting the trapezoidal distortion of the image caused by the inclination of the optical axis.

DESCRIPTION OF THE ACCOMPANYING DRAWINGS

Figure 14A:
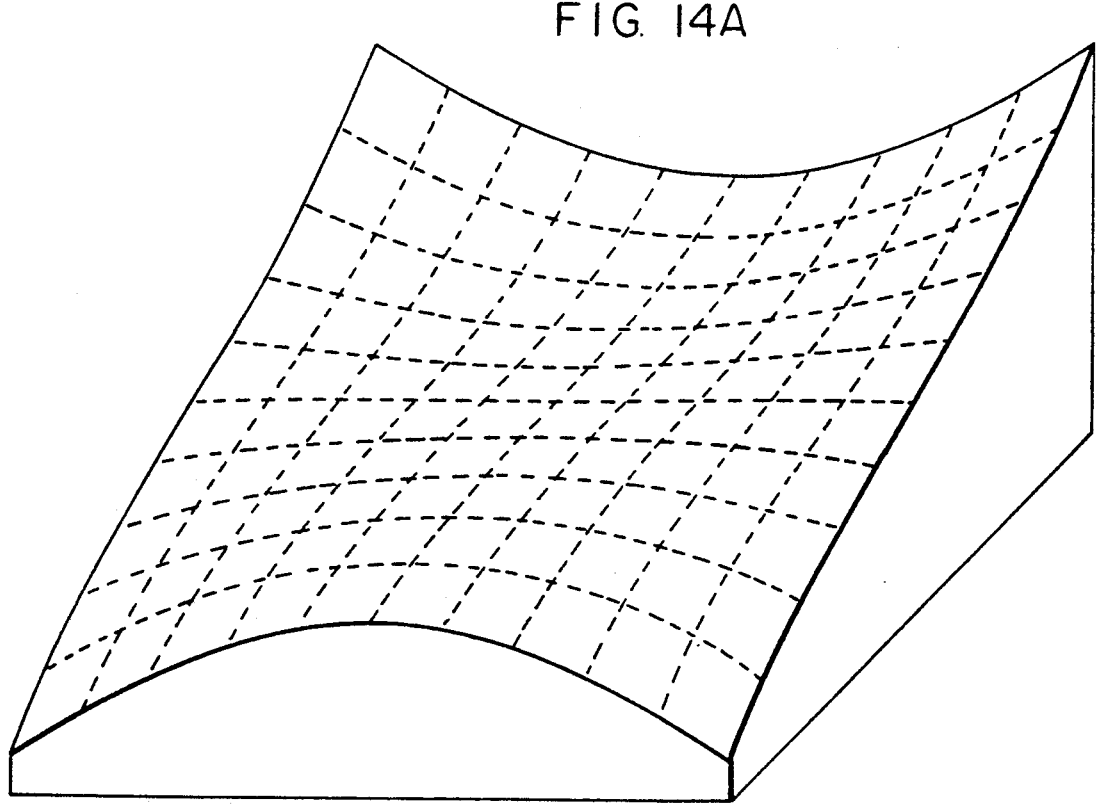
Figure 14B:
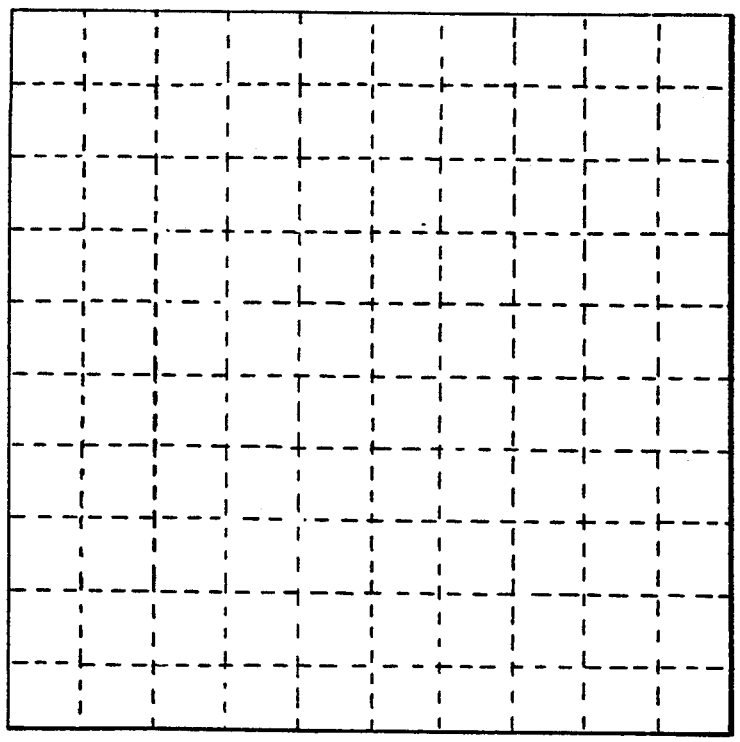
Figure 15A:
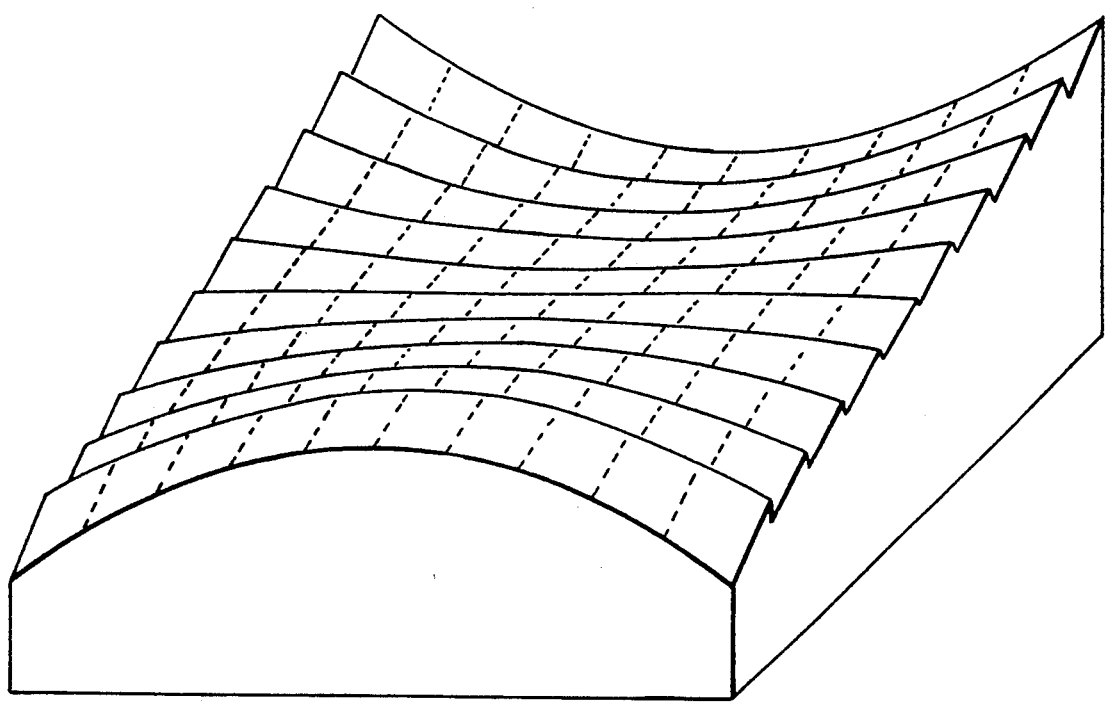
Figure 15B:
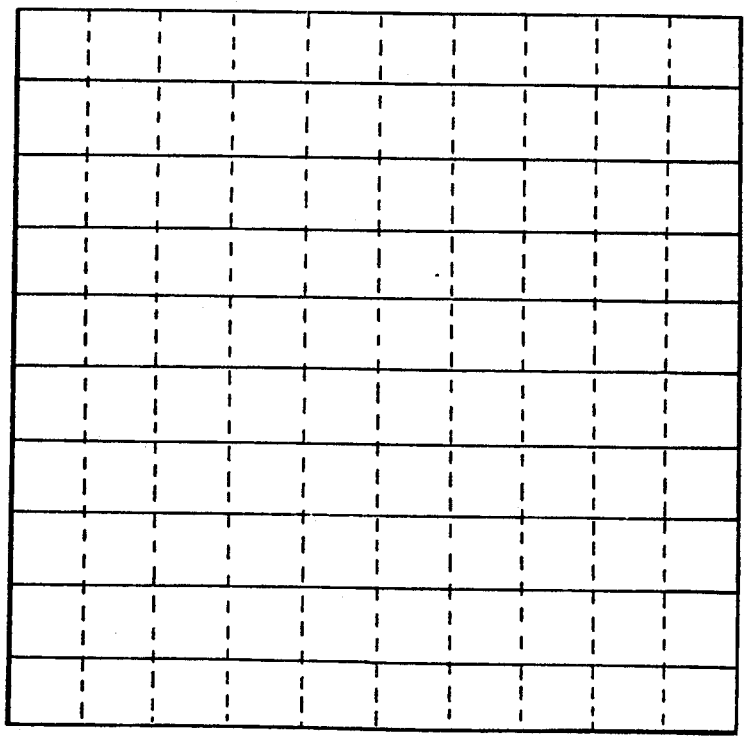
Figure 16A:
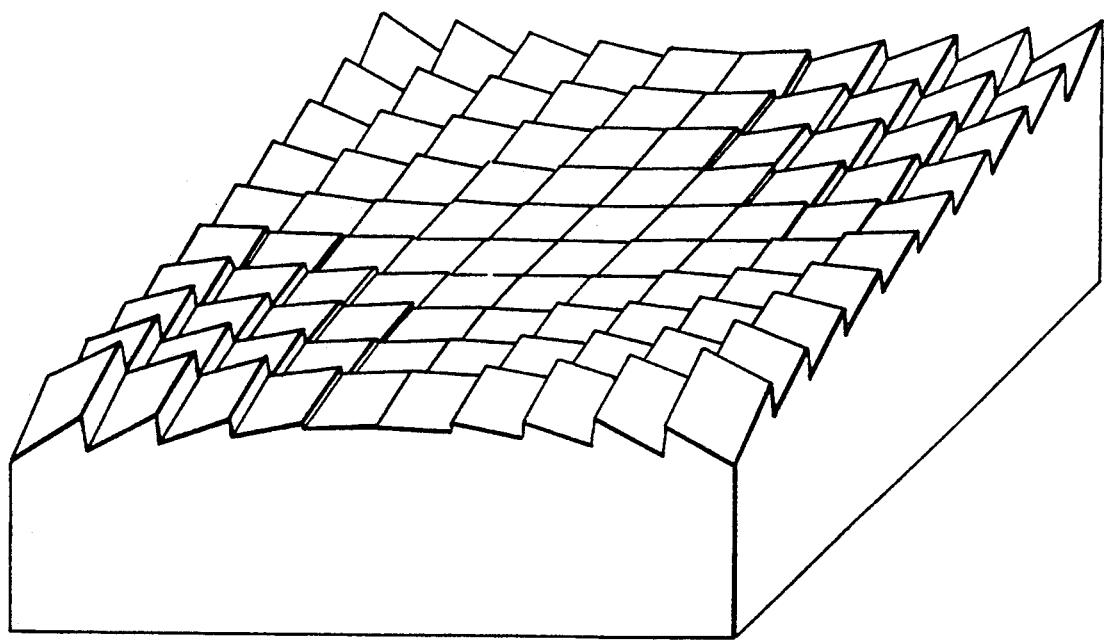
Figure 16B:
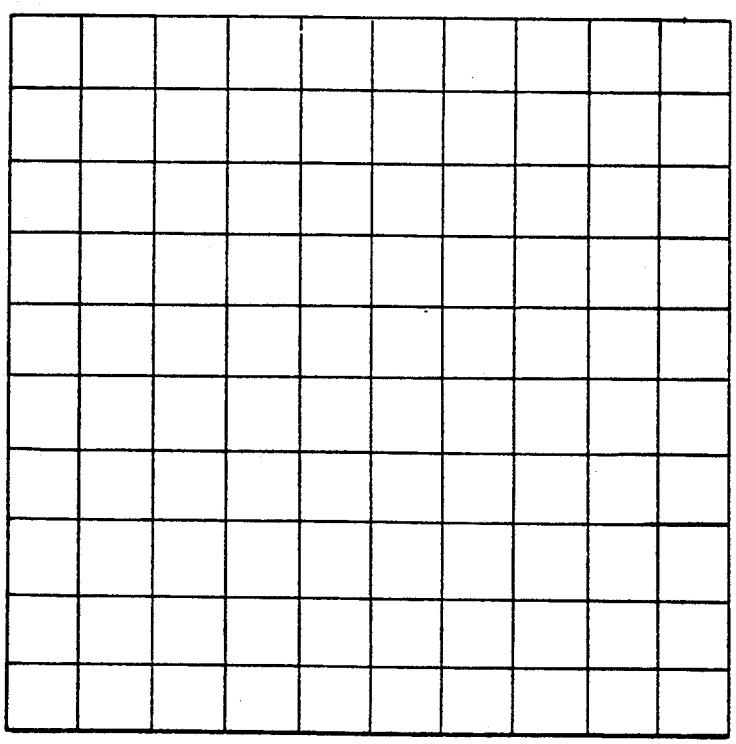

FIGS. 12A through 12F and 13A through 13F are explanatory diagrams using an actual lens and an ideal lens, respectively in the second embodiment, wherein A is a contour diagram of the original surface, B is a cross section view of the original surface, C is a diagram showing the light path, D is a diagram showing spot diagram and distortion, E is a cross section view of the original surface and a surface in macroscopic form, and F is an explanatory view of Fresnel additive quantity;

FIG. 14A is a perspective view illustrating a reflecting surface before a Fresnel-formation is executed;

FIG. 14B is a plane view of FIG. 14A;

FIG. 15A is a perspective view illustrating the reflecting surface of FIG. 14A, treated in accordance with a process of making a Fresnel-lens along one direction;

FIG. 15B is a plane view of FIG. 15A;

FIG. 16A is a perspective view illustrating the reflecting surface of FIG. 14A, treated in accordance with a process of making a Fresnel-lens along two directions; and FIG. 16B is a plane view of FIG. 16A.

microscopic form, steps similar to a Fresnel lens are formed on the surface of the reflecting mirror.

The optical system explained herein below is to magnify by 12 times and project on a screen the image formed on the chart surface of the image source with $+/-22.860$ mm in height along the y-direction and $+/-30.480$ mm in height along the z-direction on the chart surface.

Figure 1:
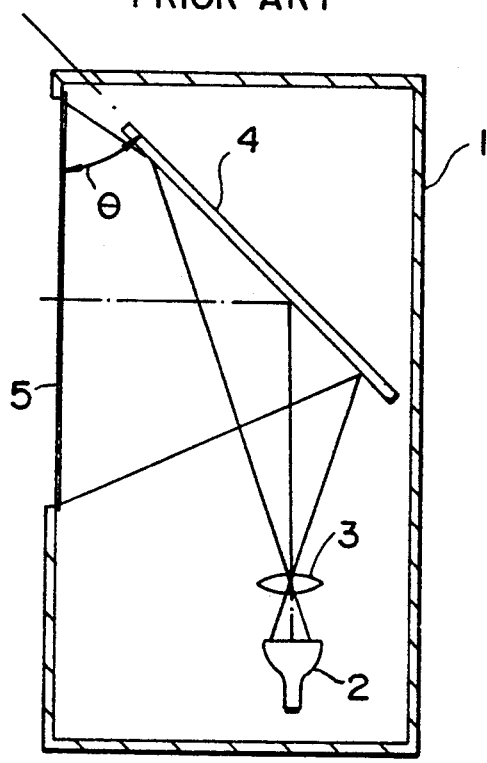
FIG. 1 is a configuration diagram showing a video projector as a conventional image projecting device.
Figure 2:
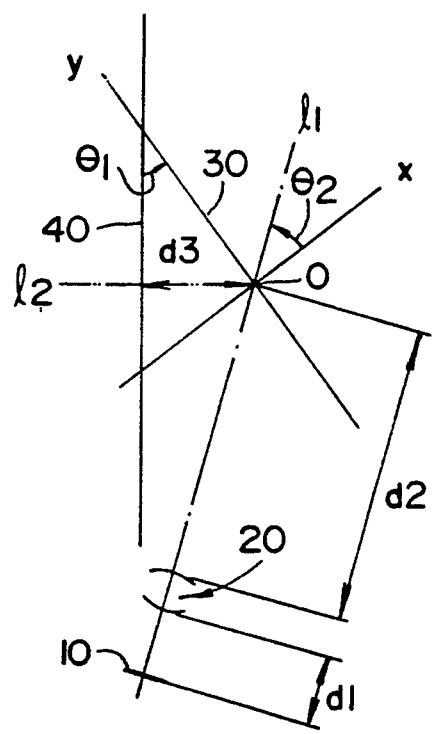
FIG. 2 is a configuration diagram of a conventional device.
Figure 3:
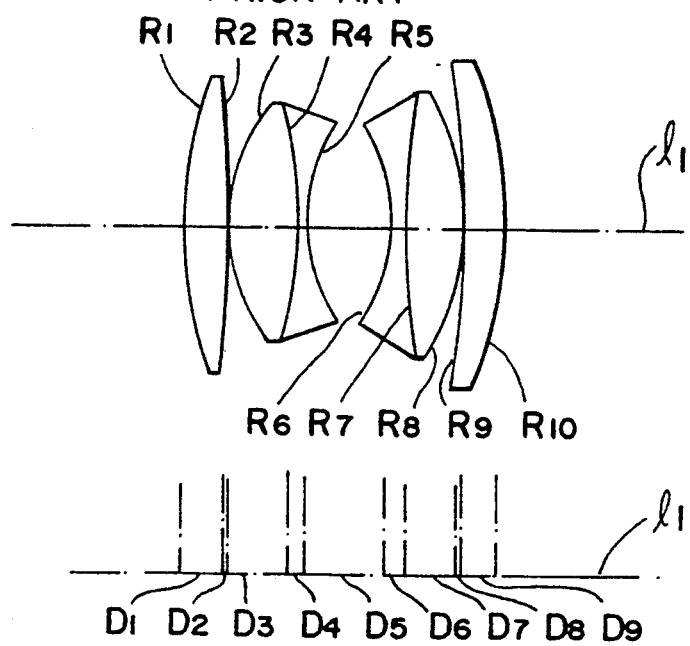
FIG. 3 is an explanatory view showing the configuration of an actual lens system.
Figure 4A:
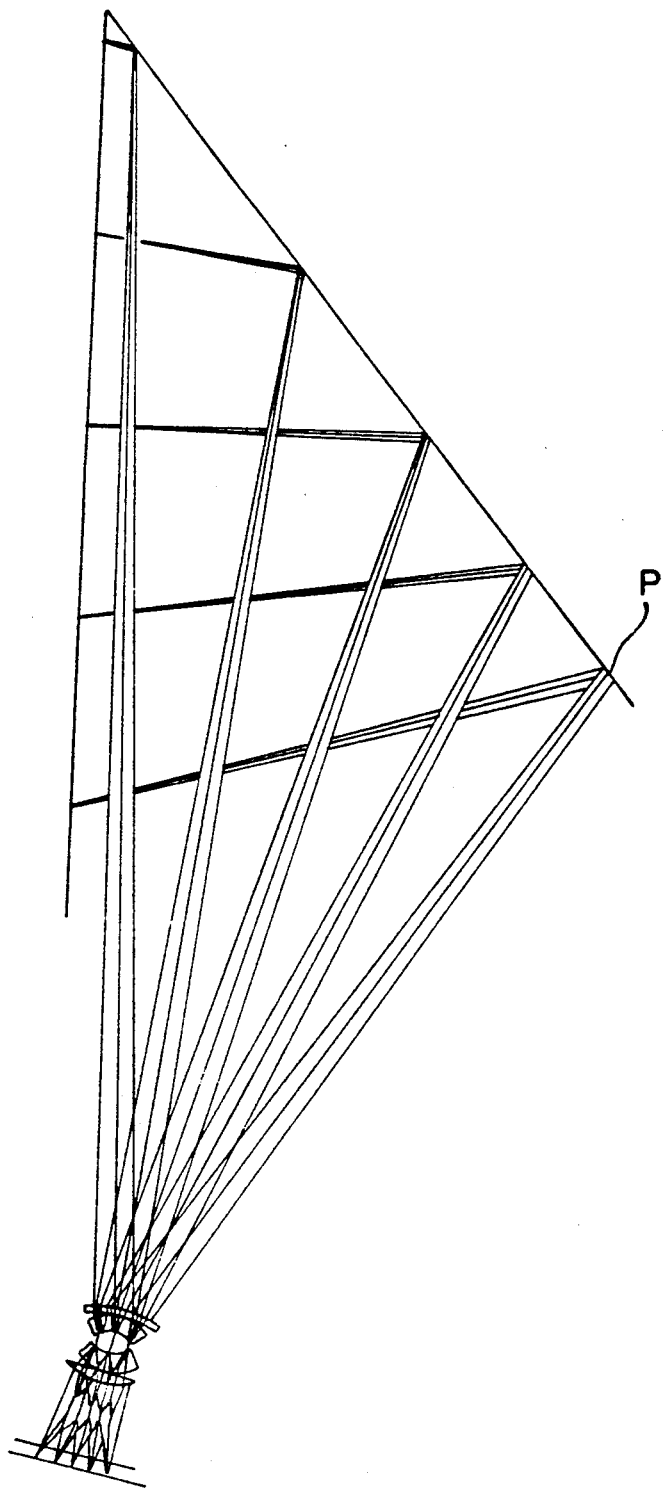
FIGS. 4A and 4B are diagrams showing the light path when using actual lens in a conventional device and an explanatory diagram showing spot diagram and distortion.
Figure 4B:
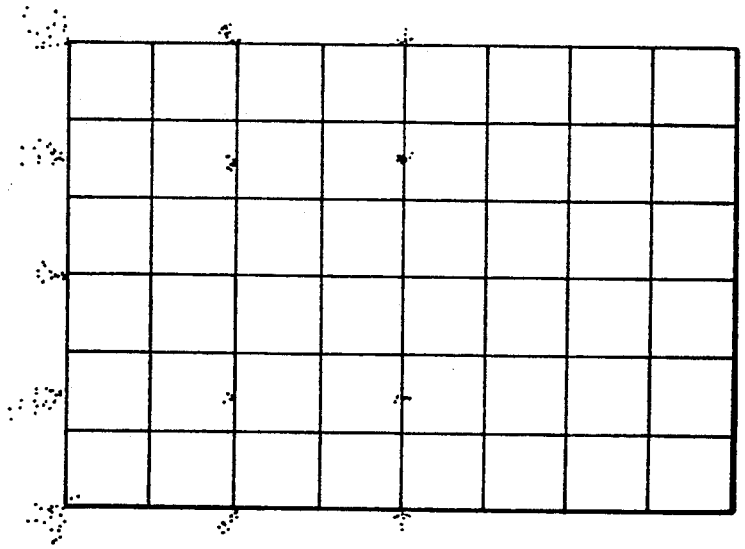
Figure 5A:
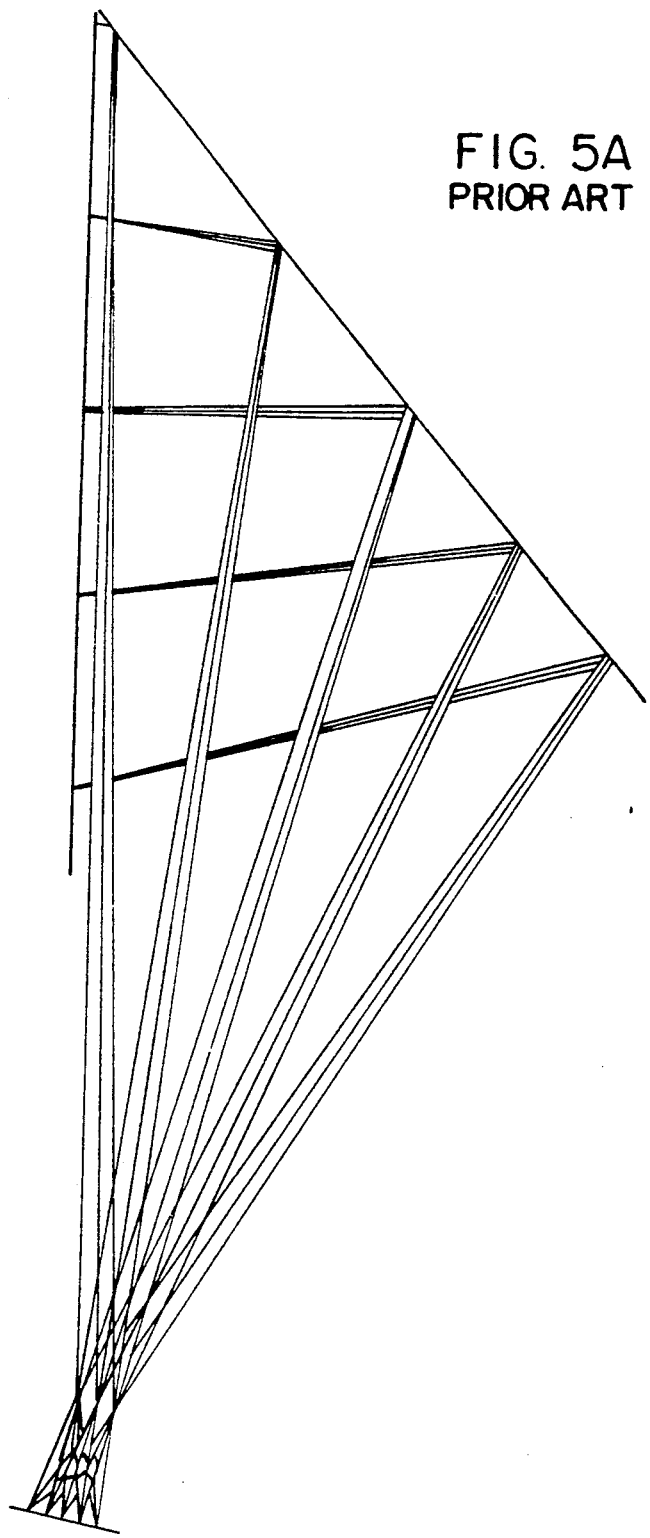
FIGS. 5A and 5B are explanatory views using an ideal lens in a conventional device.
Figure 5B:
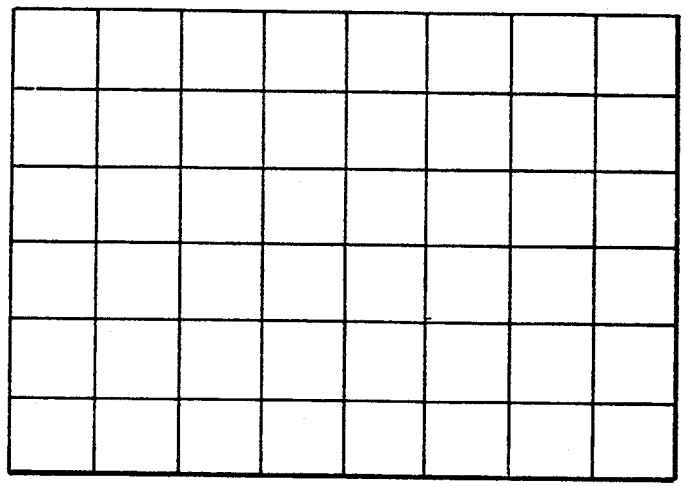
Figure 6A:
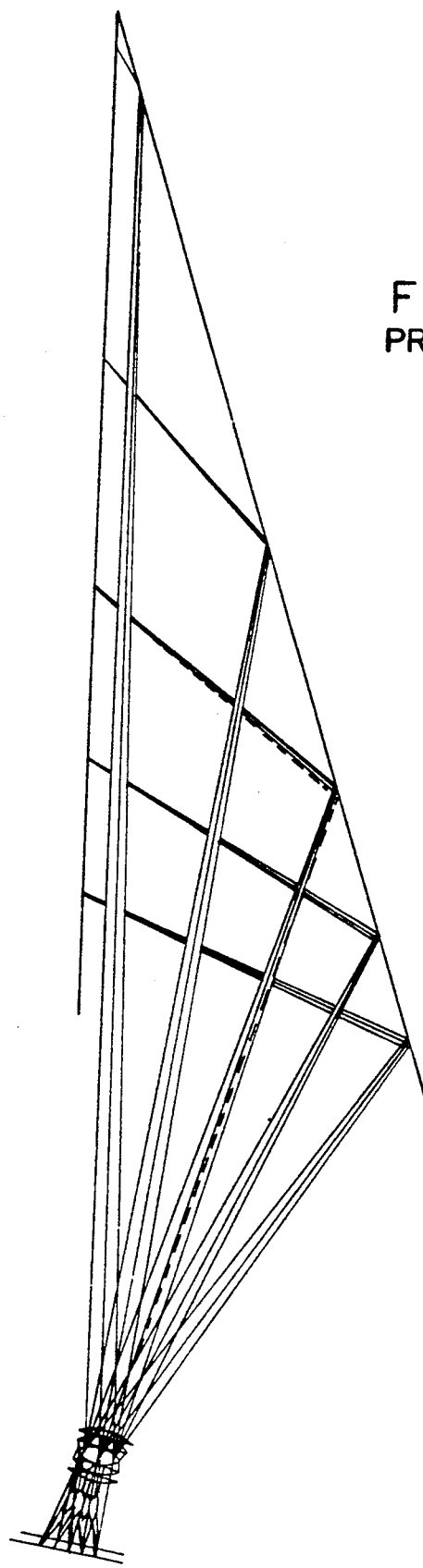
FIGS. 6A and 6B are diagrams showing the light path where a chart plane has a tilt angle, with an actual lens in use in a conventional device, and an explanatory view showing spot diagram and distortion.
Figure 6B:
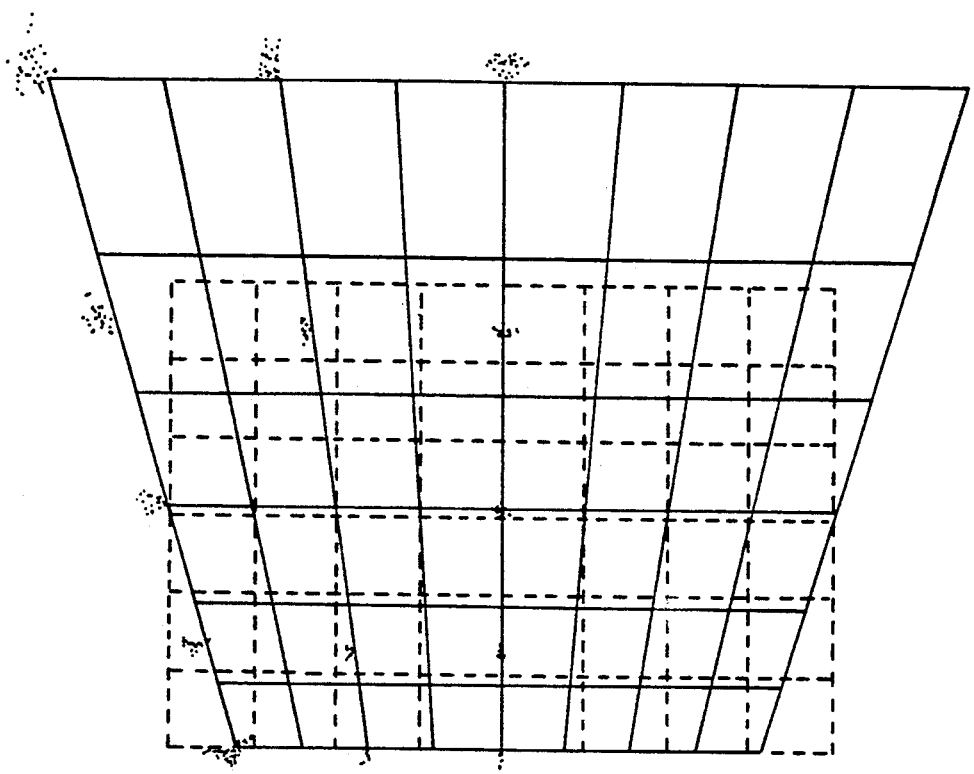
Figure 7A:
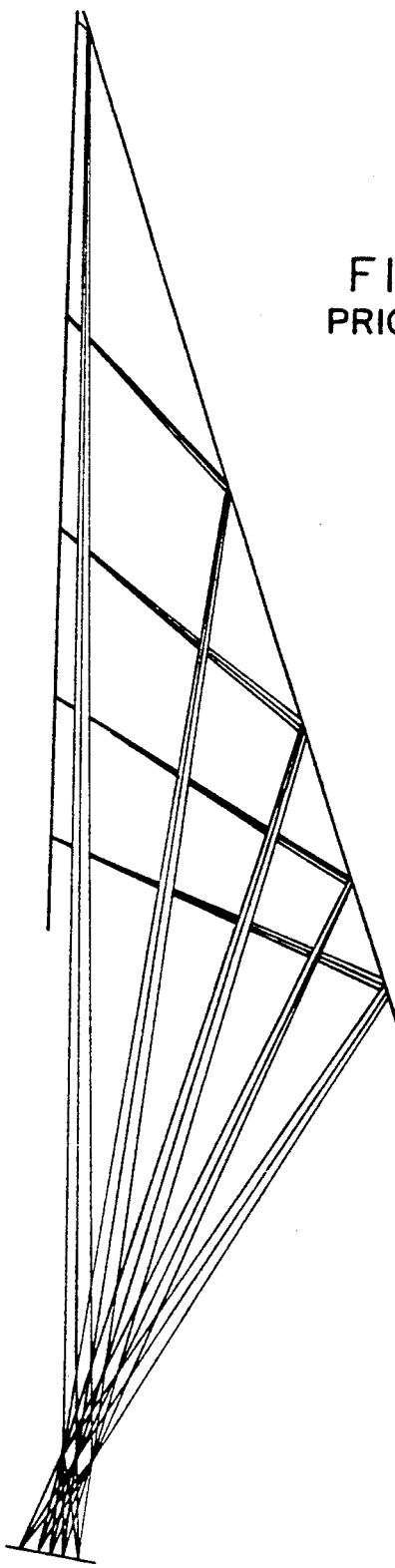
FIGS. 7A and 7B are explanatory diagrams showing the light path where the chart plane has a tilt angle, with an ideal lens in use in a conventional device.
Figure 7B:
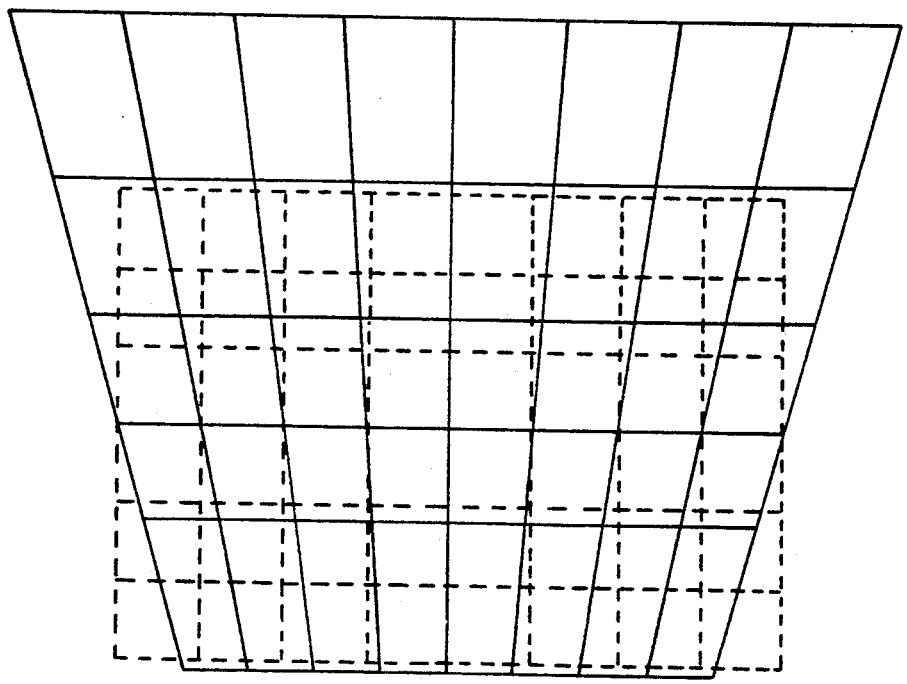
Figure 8:
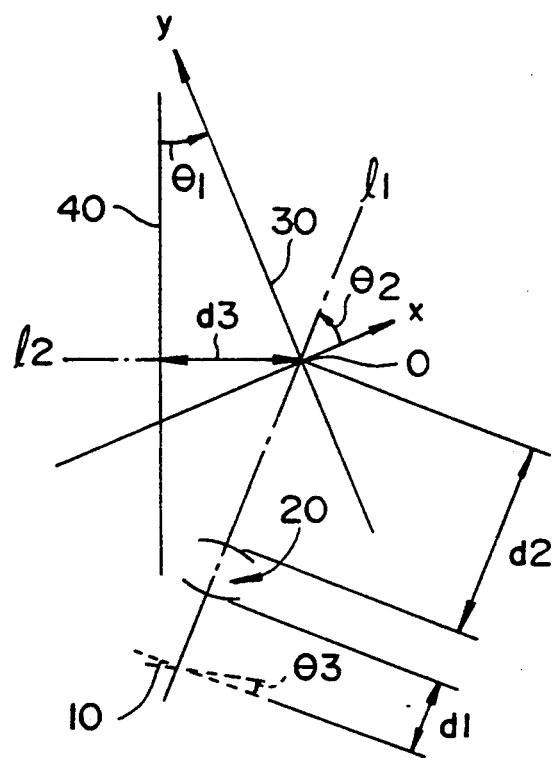
FIG. 8 is a configuration diagram of an actual example of an image projecting device embodying the invention.

The first optical system of the image projecting device embodying the invention consists of the chart surface 10 of the image source, the projection lenses 20, the reflecting mirror 30, and the screen 40 as shown in FIG. 8. For the projection lenses 20, an actual lens of 75 mm focal distance, shown in Table 1, is used. The coordinate systems in the figure are the same as that explained with respect to FIG. 2. The x-axis orthogonally passes the reflecting mirror 30 at the intersection O of the optical axis l 1 of the projection lenses 20 and the reflecting mirror 30 while the y-axis is the crossline of the surface including the optical axis l 1 and the x-axis and the reflecting mirror 30. The z-axis passes orthogonally both the X- and Y-axis.

In general, a three-dimensional surface is capable of being differentiated at all points.

$$f(x, y, z) = 0$$

and can be approximated by the binary polynomial of higher degree $$XA = \sum_{n=1}^{N} An \cdot y^{In} \cdot z^{Jn} \quad \text{①}$$

The reflecting mirror 30 employed in this embodiment is an aspheric surface expressed by the binary polynomial of sixth degree with an aspheric surface coefficient An, as shown in Table 6.

For the expression used in Table 6, for example, "3.456492E-4" corresponds to "3.456492×10⁻⁴". This expression is used for the other tables.

FIGS. 14A and 14B are views for illustrating an example of an reflecting surface satisfying the above equation ①. This reflecting surface is first treated in accordance with a process for making a Fresnel-lens along one direction, as illustrated in FIGS. 15A and 15B, and then further treated along another direction to obtain the final surface, on which Fresnel-formation is completely executed, as illustrated in FIGS. 16A and 16B.

TABLE 6

| | Jn | | | |
|---|---|---|---|---|
| In | 0 | 2 | 4 | 6 |
| 0 | | 3.456492E-4 | −8.762931E-10 | 5.903261E-15 |
| 1 | −2.204215E-1 | −4.140868E-7 | 3.726633E-13 | 3.267286E-19 |
| 2 | −2.014338E-5 | 9.752885E-11 | −1.141500E-14 | −1.641747E-19 |
| 3 | −8.480239E-7 | −7.070849E-13 | 6.487415E-17 | 3.145868E-22 |
| 4 | −1.437622E-9 | 4.505814E-15 | 1.439923E-19 | −2.505265E-25 |
| 5 | 1.808839E-12 | −3.115170E-17 | 6.487523E-25 | −2.729554E-27 |

DESCRIPTION OF EMBODIMENTS

Figure 9A:
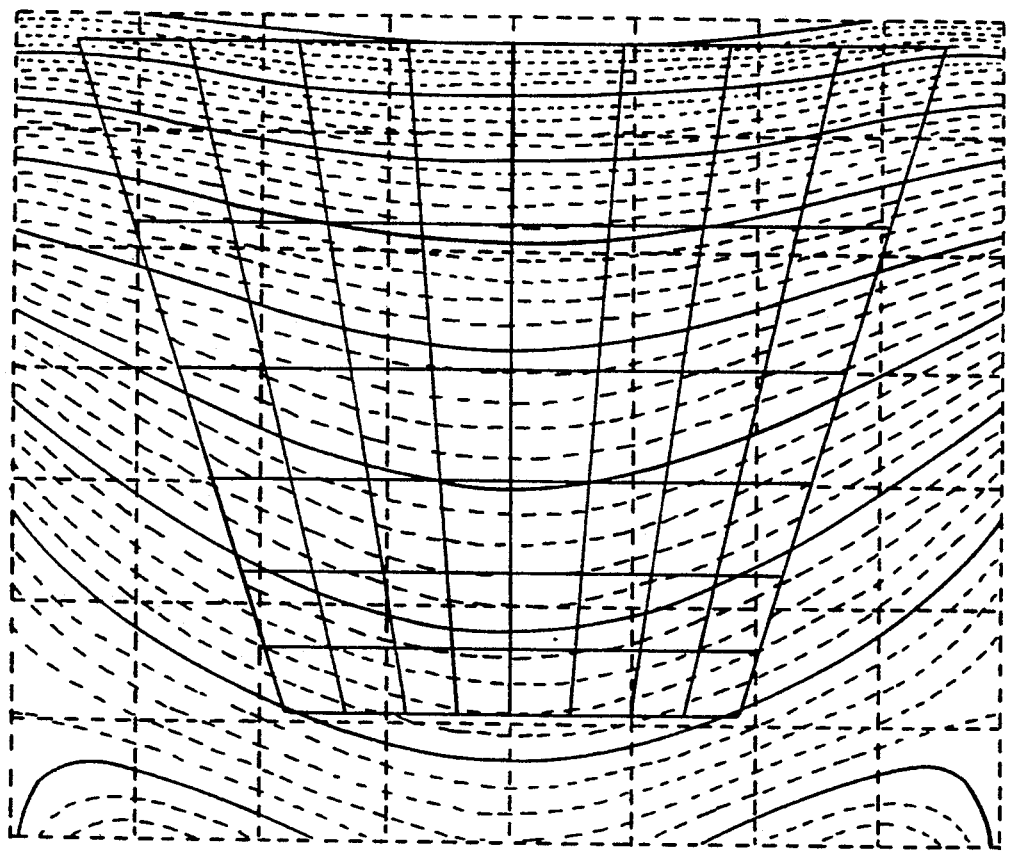
FIGS. 9A through 9D and 10A through 10D are explanatory diagrams using an actual lens and an ideal lens, respectively in this example, wherein A is a contour diagram of an original surface, B is a cross section view of the original surface, C is a diagram showing the light path and D is a diagram showing spot diagram and distortion.

The embodiment of the invention uses a reflecting mirror having a macroscopic form which is a plane and an optical effect which is equivalent to that of an aspherical mirror. The embodiment also uses a reflecting mirror having an optical effect which is equivalent to that of an aspherical mirror and a macroscopic form of another aspherical mirror. That the macroscopic form is different from the optical effect means that, in a The reflecting mirror 30 is the above-mentioned aspheric surface processed to be plane in the macroscopic form by using a process for making a Fresnel lens. The embodied microscopic form is made by cutting in steps. For the description below, the aspheric surface before processing is called the original surface while the conversion process from the original surface to the actual form is called the "Fresnel-formation". The original surface form is as shown in the contour map (with spacing of 10 mm) in FIG. 9A, showing the displacement making the y-z surface as reference. In FIG. 9A, the original is shown as 731.52×640.08 mm. The square mesh pitch is 91.44 mm and the trapezoidal mesh shows the projected image from the chart surface 10 on the reflecting mirror 30.

Figure 9B:
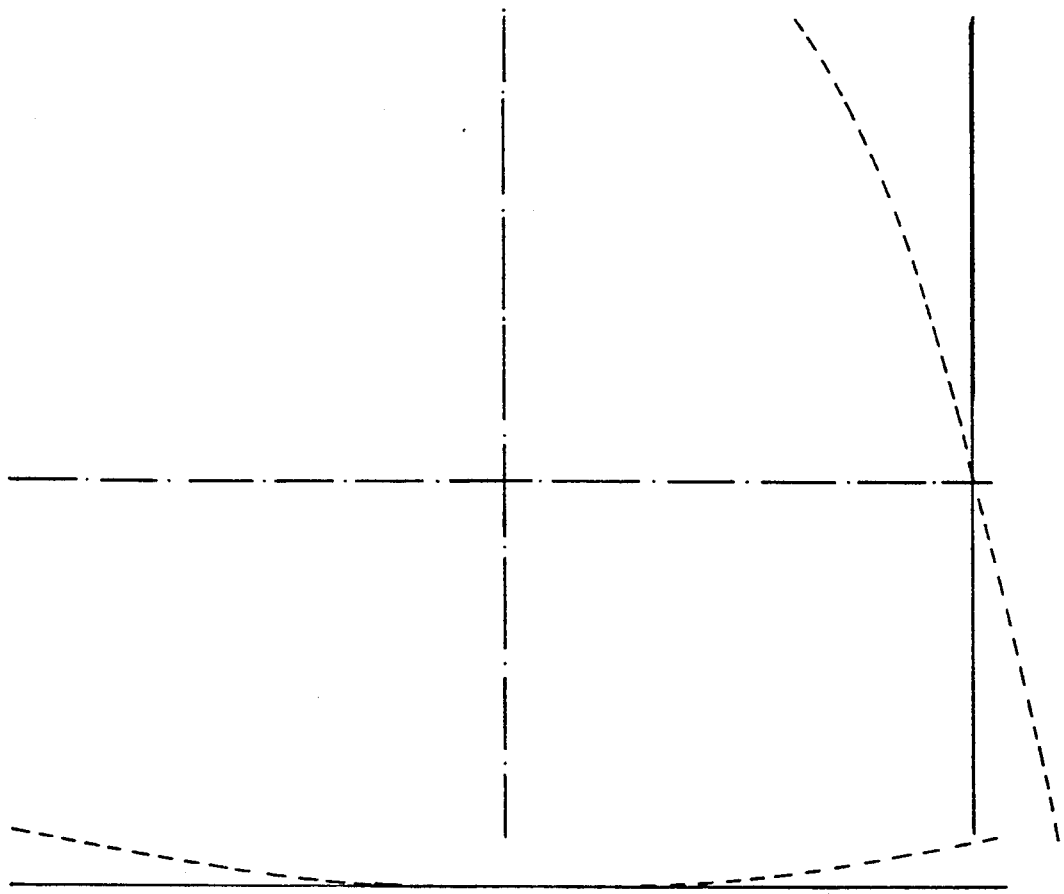

FIG. 9B shows the vertical and horizontal cross sections along the x-y surface and the x-z surface of the original surface shown in FIG. 9A. The broken line shows the cross section of the original surface while the full line shows the form after Fresnel-formation (coinciding with the y-z surface).

The original surface is basically a cylindrical convex surface symmetrical about the x-y surface. The upper perimeter of the original surface close to the screen 40 has a curvature for the screen on the vertical cross section in the y-direction while the horizontal cross section parallel with the z-axis is a curved surface, the cylinder curvature radius of which becomes gradually small toward the lower section aparting from the screen 40.

The reflecting mirror 30, the macroscopic form of which is plane, but the optical effect of which is the same as the above-mentioned aspheric surface mirror, suppresses the upper expansion for the y-axis components of the trapezoidal mesh shown in FIG. 9A and magnifies the lower section much more than the upper section for the components in parallel with the z-axis to make them reflect on the screen 40. When the reflecting mirror 30 is the same form as the original surface, even though the distortion of the optical image can be compensated, image formation is degraded. To avoid this degradation, a Fresnel formation is required.

The reflecting mirror 30 is arranged with the tilt angle $\theta_1$ against the screen 40. The angle of the optical axis 1 1 for the x-axis is set to be $\theta_2$, the tilt angle to $\theta_3$, the distance from the chart surface 10 along the optical axis 1 1 to the first surface of the projection lenses 20 to $d_1$, the distance from the last surface of the lens system to the origin 0 to $d_2$, and the origin 0 along the reflecting path 1 2 of the optical axis 1 1 from the reflecting mirror 30 to the screen 40 is set 0 to $d_3$.

The specifications or an actual lens are as per the values given in Table 7. The light path in this case is as shown in FIG. 9C and the distorsion and spot diagram are as shown in FIG. 9D.

TABLE 7

| | |
|---|---|
| $\theta_1$ = 22.0° | $d_1$ = 68.219 mm |
| $\theta_2$ = 45.0° | $d_2$ = 535.000 mm |
| $\theta_3$ = 2.485° | $d_3$ = 215.000 mm |

Figure 9C:
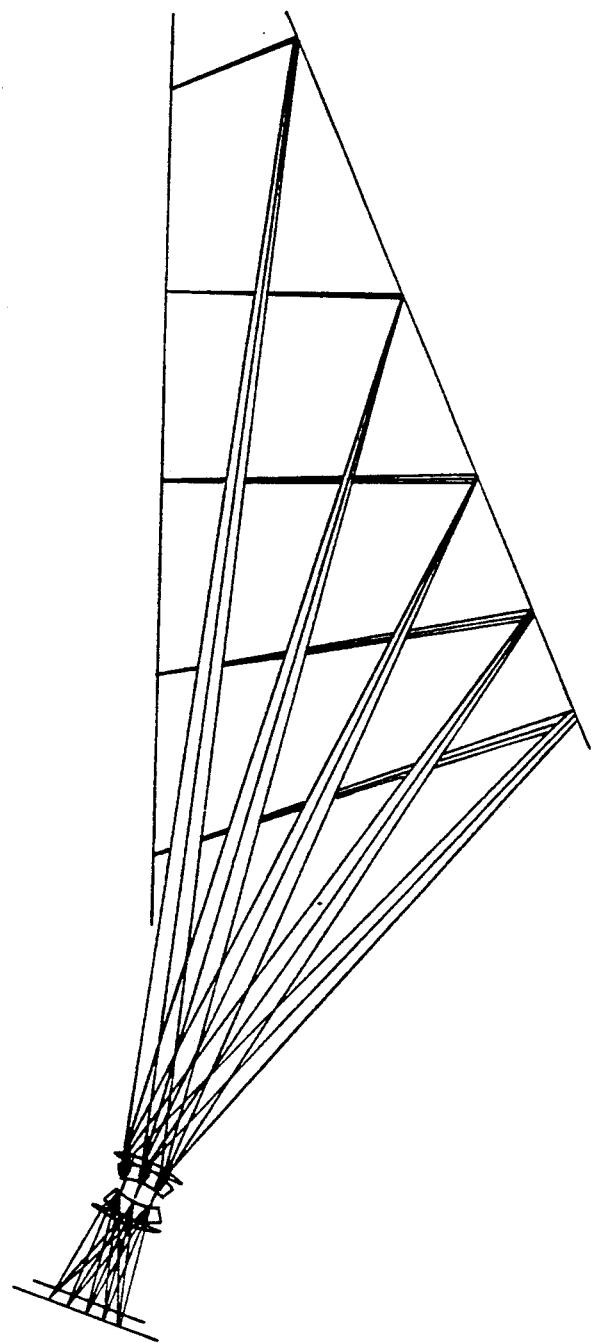
Figure 9D:
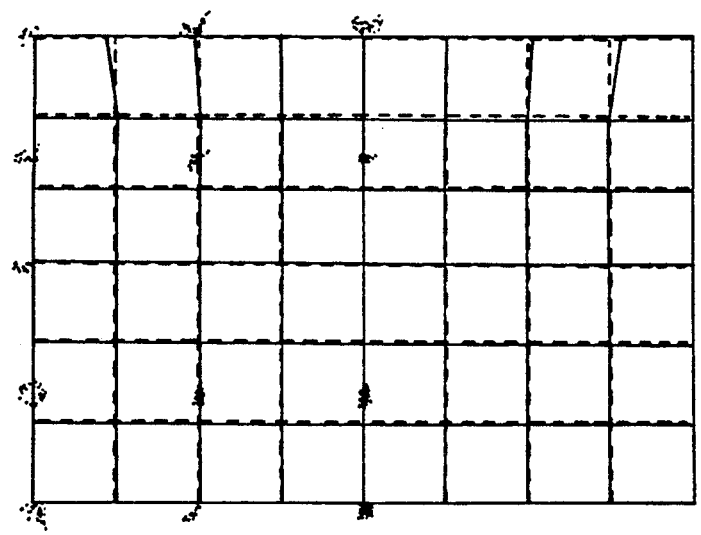

FIG. 9C shows main five beams with heights of −22.860 mm, −11.430 mm, 0.000 mm, 11.430 mm and 22.860 mm, respectively, in the y-direction on the chart surface 10 and two peripheral beams for each main beam. In FIG. 9D, the reference mesh of 91.44 mm-pitch is shown by the broken line while a spot shows the result obtained from the simulation by using 100 beams for one point on scale of 1 to 10 with respect to the mesh.

The thickness index for the optical system constructed as mentioned above is d=282.617 mm.

Thus, the thickness is reduced as compared with a conventional arrangement, while at the same time, distortion is considerably suppressed. This makes the arrangement suitable for general-purpose uses and even for some particular applications.

The design numeric value and performance when an ideal lens is used for the projection lenses 20 are shown below for reference.

The optical effect of the reflecting mirror 30 is the same as that of the aspherical mirror applied with the aspheric surface coefficient An, as shown in Table 8 and equation (1), described above.

TABLE 8

| | Jn | | | |
|---|---|---|---|---|
| In | 0 | 2 | 4 | 6 |
| 0 | | 4.670468E-4 | −3.507044E-9 | 2.827480E-14 |
| 1 | −2.231299E-1 | −6.436813E-7 | 1.254195E-11 | −1.454360E-16 |
| 2 | −6.925074E-6 | −1.854793E-9 | 2.400243E-14 | 1.299026E-19 |
| 3 | −6.183992E-7 | −4.294505E-12 | −3.372547E-17 | 2.817408E-22 |
| 4 | −7.766720E-10 | 6.383136E-15 | 5.573422E-20 | −1.952912E-24 |
| 5 | −1.818660E-12 | 2.942887E-17 | −3.065176E-22 | 2.766155E-27 |

Figure 10A:
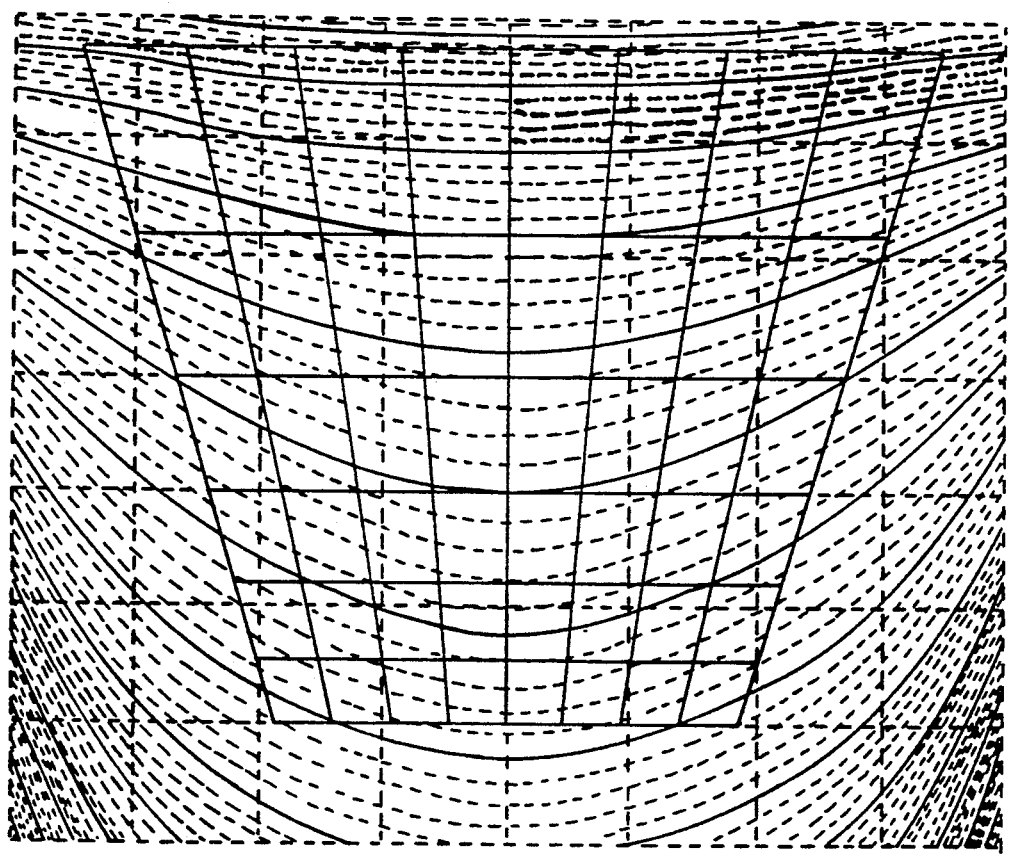
Figure 10B:
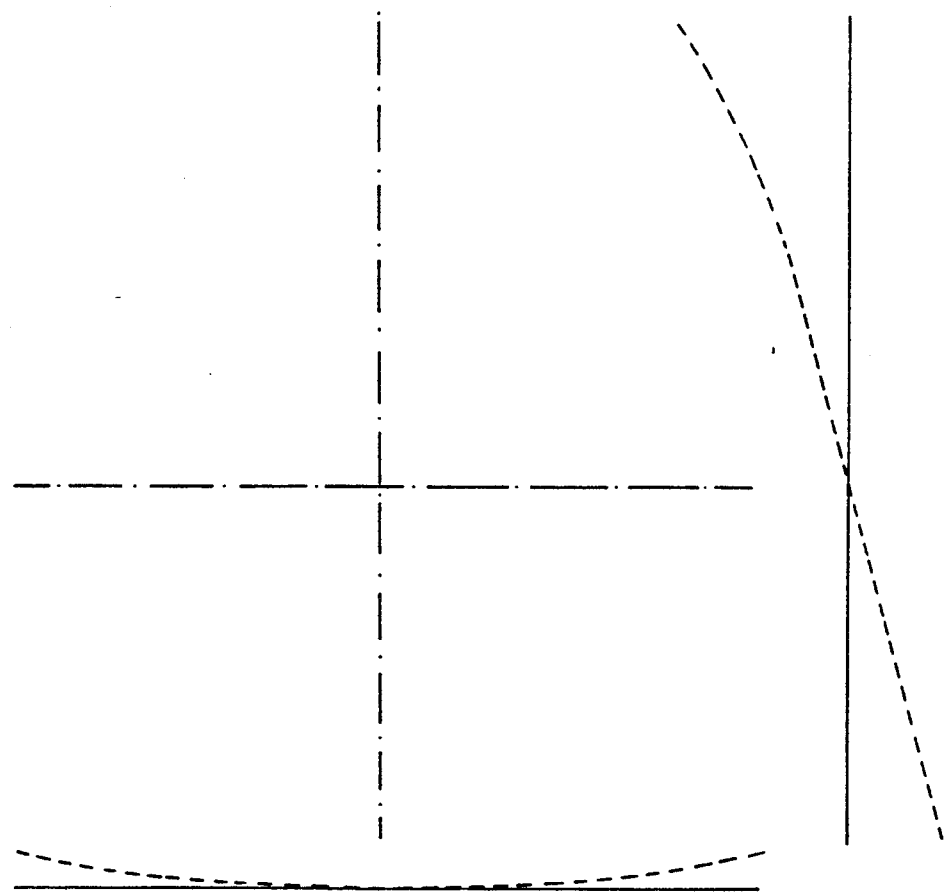

This original surface form is shown in the contour map (with spacing of 10 mm) of FIG. 10A. FIG. 10B shows the vertical and horizontal cross sections along the x-y surface and the x-z surface of the original surface. The broken line shows the cross section of the original surface while the dashed line shows the y-z surface.

Table 9 shows the tilt angle and the distance, and definitions of the symbols are the same as that for the embodiment for an actual lens. The ideal lens is assumed to have a thickness of 0 (Zero).

TABLE 9

| | |
|---|---|
| $\theta_1$ = 22.000° | $d_1$ = 82.585 mm |
| $\theta_2$ = 46.000° | $d_2$ = 600.000 mm |
| $\theta_3$ = 3.802° | $d_3$ = 210.000 mm |

Figure 10C:
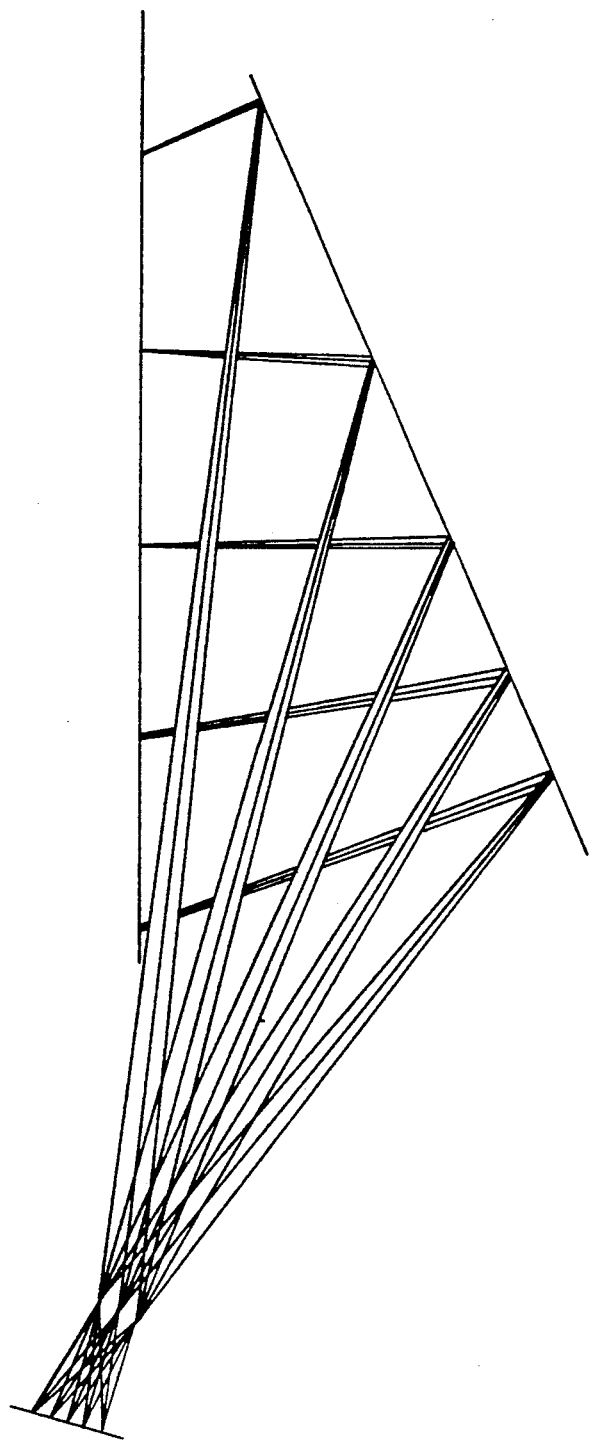
Figure 10D:
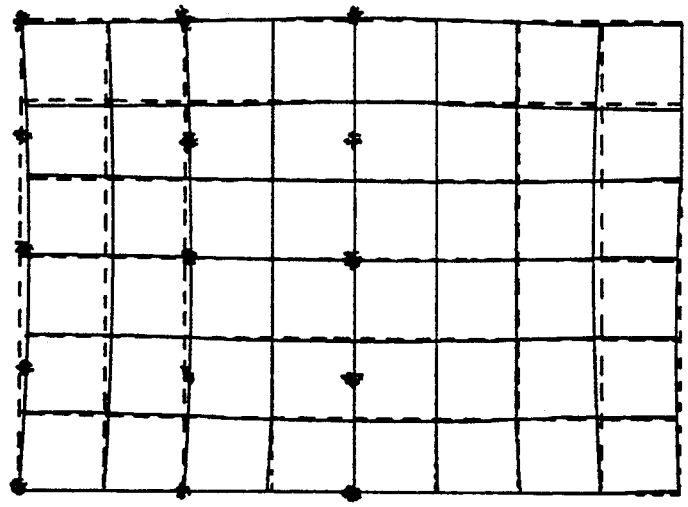

The light path according to the arrangement as above is shown in FIG. 10C while the diagram of the optical image is shown in FIG. 10D. FIG. 10D shows the spot corresponding to 100 beams from one point on the chart 10 by simulating with the same method used for FIG. 9D.

The thickness index is $d_T$=278.269 mm in case of this construction.

Figure 11:
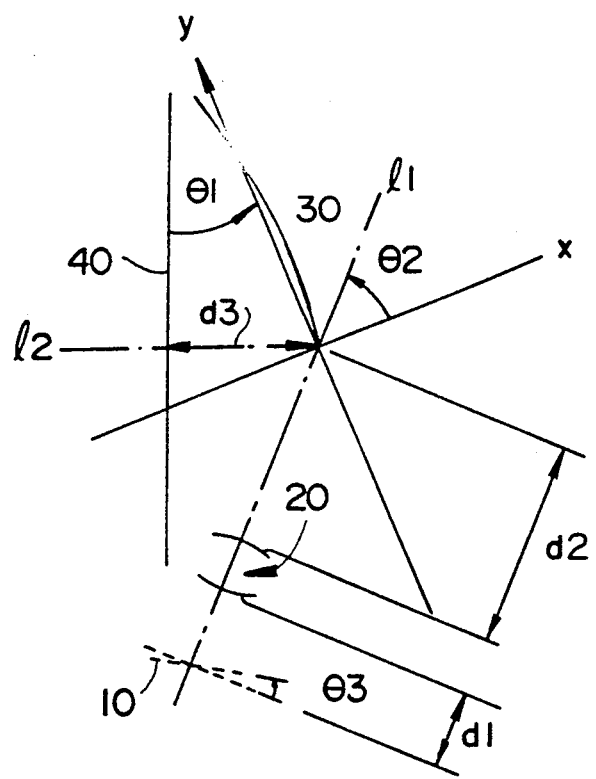
FIG. 11 is a configuration diagram showing a second embodiment of an image projecting device embodying the invention.

FIG. 11 shows a configuration diagram of a second embodiment, for which further improvement is intended by making the reflecting mirror an aspheric surface even in the macroscopic form.

The optical system of the second embodiment shown in FIG. 11 comprises the chart surface 10, the projection lenses 20, the reflecting mirror 30 and the screen 40. For the projection lenses 20, an actual lens of 75 mm focal distance, shown in Table 1, is used. Since the form of the reflecting mirror 30 is not plane macroscopically, the definition of the coordinate system which is used for the previously-mentioned embodiment must be changed.

In FIG. 11, the normal for the flat surface (before Fresnel-formation) of the reflecting mirror 30, at the intersection Q of the optical axis 11 of the projection lenses 20 and the reflecting mirror 30, is defined as the x-axis. The crossline of the surface including the optical axis 11 and the x-axis, and the surface passing the intersection O and crossing at right angles with the x-axis, is defined as the y-axis. The axis crossing orthogonally both X-and Y axes is defined as the z-axis.

The reflecting mirror 30 is cut microscopically in steps, so that, its macroscopic form and optical effects are different. The original surface before Fresnel-formation is the same as the aspheric surface applying aspheric surface coefficient An, shown in Table 10, according to the following equation (2).

$$Xo = \sum_{n=1}^{N} An \cdot y^{In} \cdot Z^{Jn} \quad (2)$$

Figure 12A:
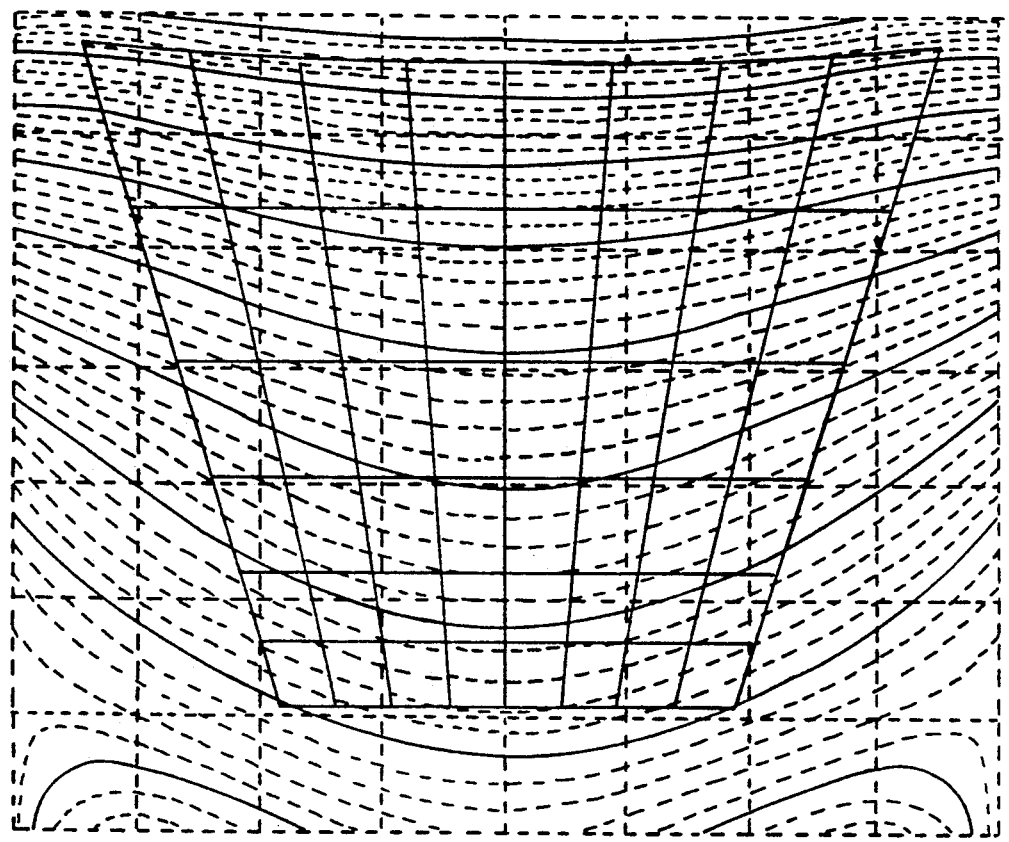

The original surface form is shown in the contour map (with spacing of 10 mm) of FIG. 12A, showing the displacement from the y-z surface. In FIG. 12A, the square mesh pitch is 91.44 mm and the trapezoidal mesh shows the projected image from the chart surface 10.

TABLE 10

| | | Jn | | |
|---|---|---|---|---|
| In | 0 | 2 | 4 | 6 |
| 0 | | 3.528070E-4 | −8.681713E-10 | 5.697264E-15 |
| 1 | −2.204215E-1 | −4.140868E-7 | 3.726633E-13 | 3.267286E-19 |
| 2 | −3.921005E-5 | 3.520291E-11 | −1.259614E-14 | −1.627495E-19 |
| 3 | −8.697836E-7 | −8.835924E-13 | 6.668946E-17 | 3.388678E-22 |
| 4 | −1.228876E-9 | 4.088457E-15 | 1.381207E-19 | −2.413316E-25 |
| 5 | 2.318049E-12 | −3.252200E-17 | −9.197472E-24 | −2.735122E-27 |

In this embodiment, the macroscopic form of the reflecting mirror 30 is an aspheric surface that is different from the above-mentioned original surface.

The x-coordinate $X_F$ on the macroscopic form surface after Fresnel-formation can be obtained from an equation (3), described below, by using x-coordinate Xo of the original surface. Fm is the Fresnel coefficient shown in Table 11.

$$X_F = \sum_{m=1}^{5} Fm \cdot Xo^{Lm} \quad (3)$$

Figure 12B:
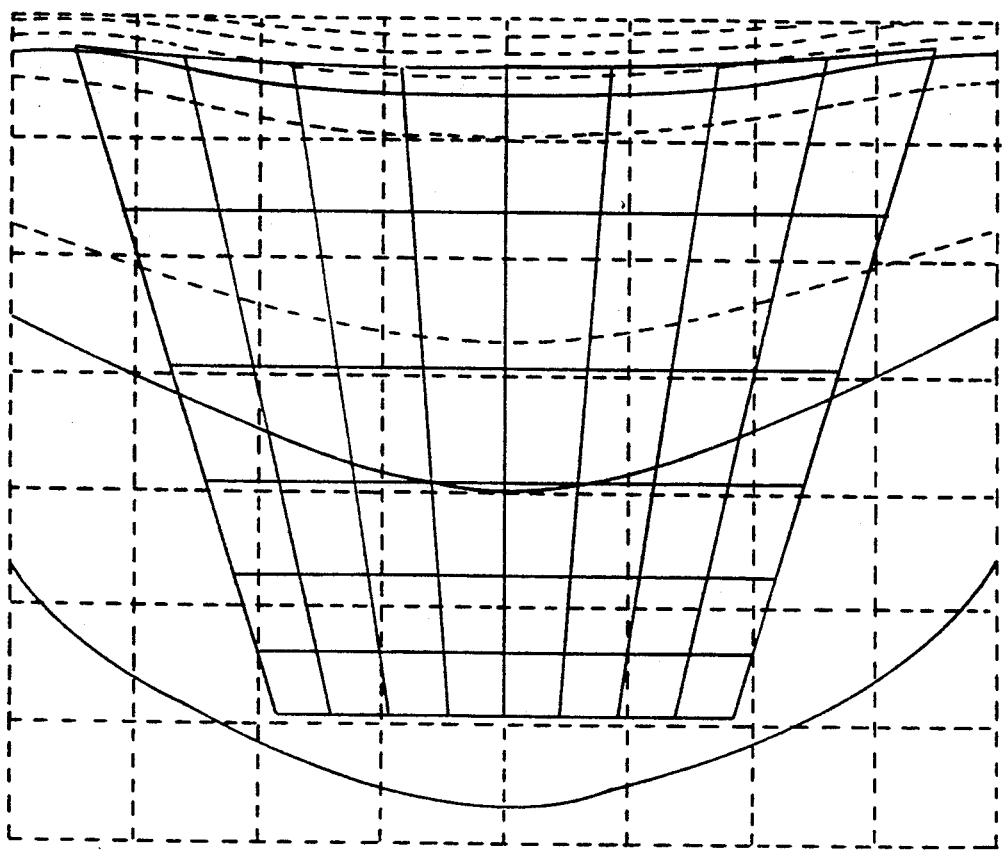

The macroscopic form surface is as shown in the contour map (with spacing of 5 mm) of FIG. 12B, showing the displacement from the y-z surface.

TABLE 11

| Lm | Fm |
|---|---|
| 1 | −1.522627E-1 |
| 2 | 1.851191E-3 |
| 3 | 2.720661E-5 |
| 4 | −1.723094E-7 |
| 5 | −1.120738E-9 |

FIG. 12E shows the vertical and horizontal cross sections along the x-y surface and the x-z surface of the original surface and the macroscopic form. The broken line shows the original surface, the dashed line shows the macroscopic form after Fresnel-formation, and the dashed line shows the y-z surface.

The original surface is basically a cylindrical convex surface symmetrical about the y-axis. The upper perimeter of the original surface that is close to the screen 40 has a curvature for the screen on the vertical cross section in the y-direction while the horizontal cross section parallel with the z-axis is a curved surface, the cylinder curvature radius of which becomes smaller gradually toward the lower section aparting from the screen 40.

The macroscopic form surface is symmetrical about the y-axis. The upper perimeter of the macroscopic form surface close to the screen 40 has a curvature to the screen 40 on the vertical section in the y-direction and the horizontal section parallel with the z-axis is an aspheric surface almost along the y-z surface.

Figure 12C:
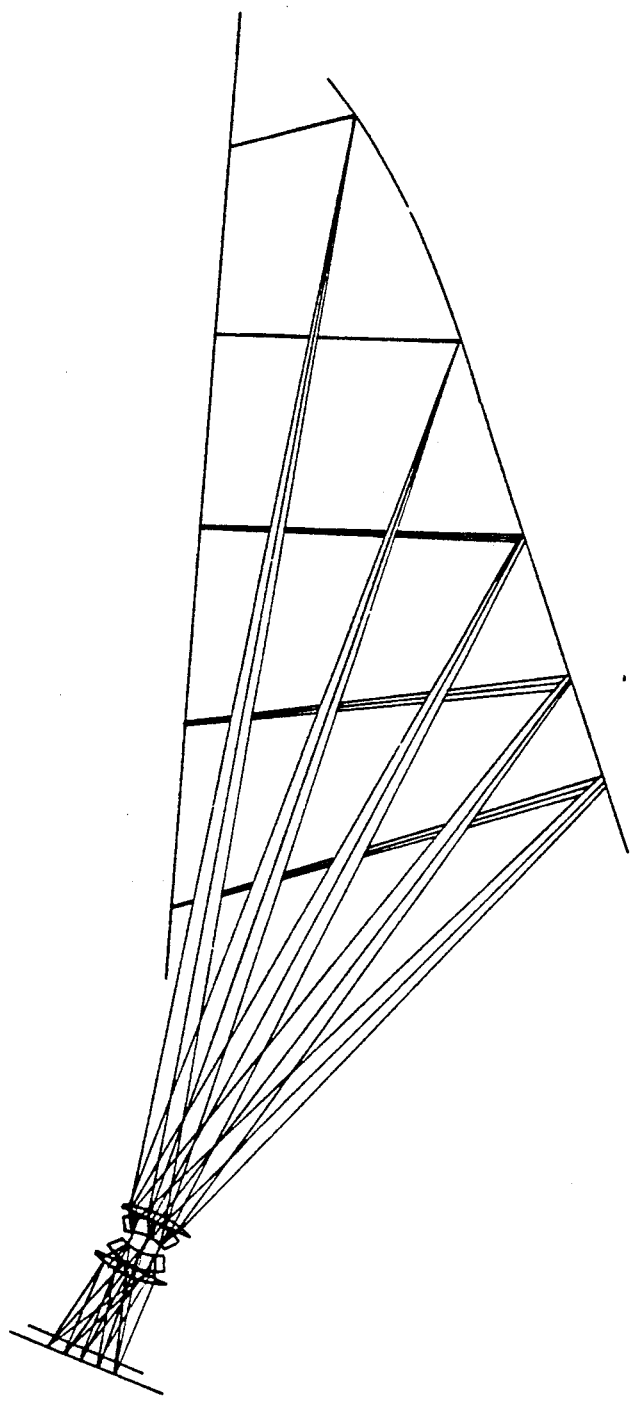
Figure 12D:
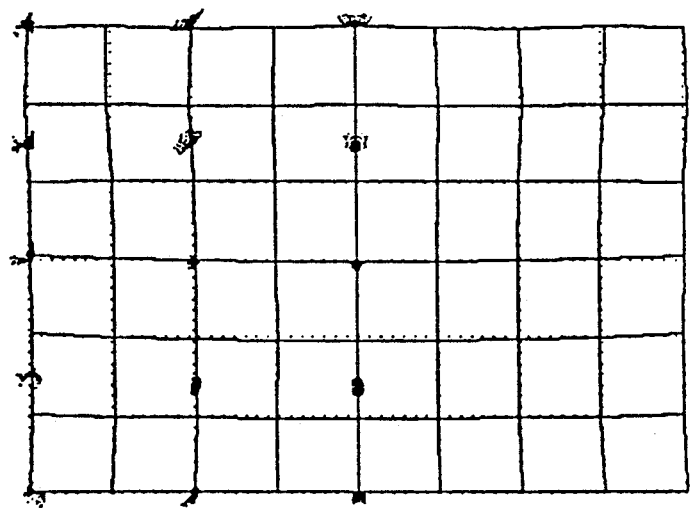
Figure 12F:
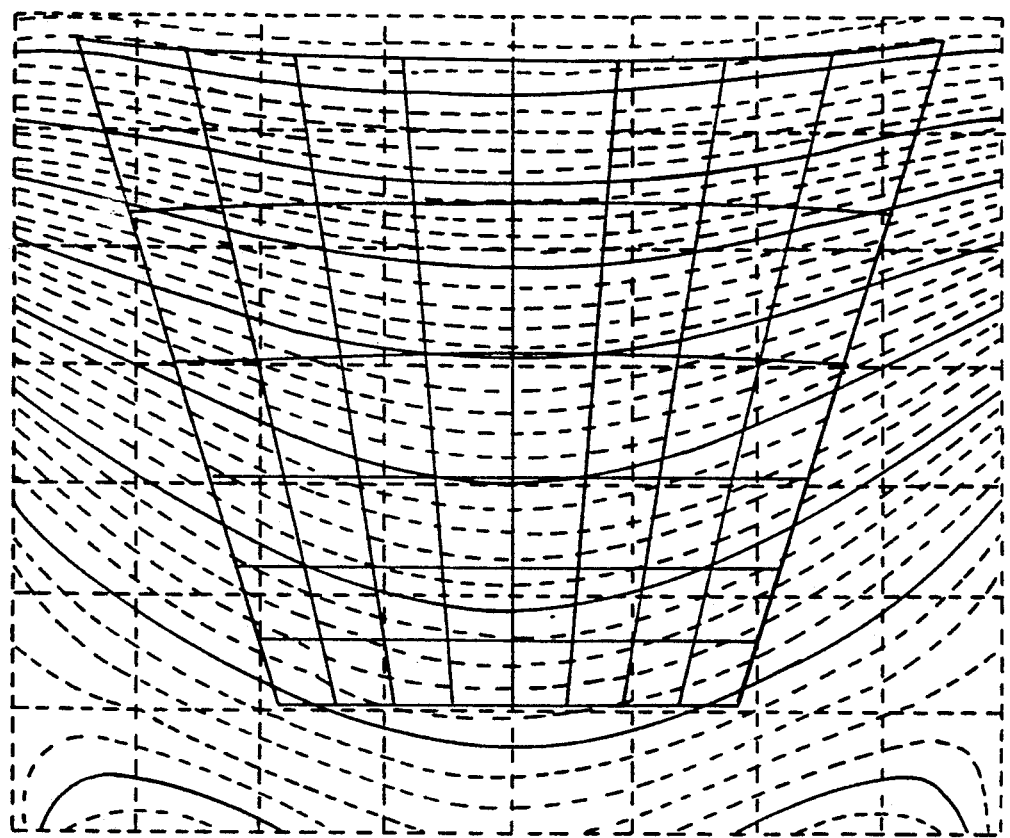

FIG. 12F shows the contour map (with spacing of 10 mm) showing the added amount to make the original surface fit to the macroscopic form surface by using the Fresnel-formation, that is, the amount obtained by subtracting the original surface form from the macroscopic form as displacement from the y-z surface.

The reflecting mirror 30 constructed as above is provided with an inclination to the screen 40. Inclination angle $\theta_1$ shows the inclination of the screen 40 with respect to the y-z surface. The definitions for $\theta_2$, $\theta_3$, d1, d2, and d3 are the same as those for the above-mentioned embodiment.

The specifications required when an actual lens is used are given by the values shown in Table 12. The light path in that case is shown in FIG. 12C, while the distortion and spot diagram are shown in FIG. 12D.

TABLE 12

| $\theta_1$ = 22.000° | $d_1$ = 68.334 mm |
|---|---|
| $\theta_2$ = 45.000° | $d_2$ = 535.000 mm |
| $\theta_3$ = 2.577° | $d_3$ = 215.000 mm |

FIG. 12C shows main beams with a height of −22.860 mm, −11,430 mm, 0.000 mm, 11.430 mm and 22.880 mm, respectively, in the y-direction on the chart surface 10 and two adjacent beams for each main beam. In FIG. 12D, the reference mesh of 91.44 mm-pitch is shown by the broken line while a spot shows the performance by using 100 beams for one point on scale of 1 to 10 with respect to the mesh.

The thickness index for the optical system constructed as mentioned above is $d_T$=278.269 mm.

When the macroscopic form is made an aspheric mirror, the spot diagram is the same as that of the flat surface, while the distortion is considerably improved. Therefore, this can be used for an application which requires further enhanced performance.

The design numeric value and performance when an ideal lens is used as the projection lenses 20 are shown below for reference.

The optical effect of the reflecting mirror 30 becoming the aspheric surface is obtained by applying the aspheric surface coefficient, as shown in Table 13, to equation (2) discussed above. The macroscopic form becomes the surface obtained by applying Fresnel coefficient Fm shown in Table 14 to the afore-mentioned equation (3).

TABLE 13

| In | Jn 0 | 2 | 4 | 6 |
|---|---|---|---|---|
| 0 |  | 4.643117E-4 | −2.194875E-9 | 2.071886E-14 |
| 1 | −1.252756E-6 | −2.164351E-7 | 3.685454E-12 | −8.960472E-17 |
| 2 | −8.960472E-6 | −7.315582E-10 | 1.781224E-14 | 1.372100E-19 |
| 3 | −5.108854E-7 | 1.667779E-12 | −3.948368E-17 | 3.235032E-22 |
| 4 | −5.972737E-10 | 1.064553E-14 | 8.359902E-20 | −2.734763E-24 |
| 5 | −8.520908E-13 | −2.979920E-17 | −1.137307E-22 | 3.004459E-27 |

TABLE 14

| Lm | Fm |
|---|---|
| 1 | −5.833054E-1 |
| 2 | −4.497541E-3 |
| 3 | 9.415557E-6 |
| 4 | 5.538555E-8 |
| 5 | 4.459682E-10 |

Figure 13A:
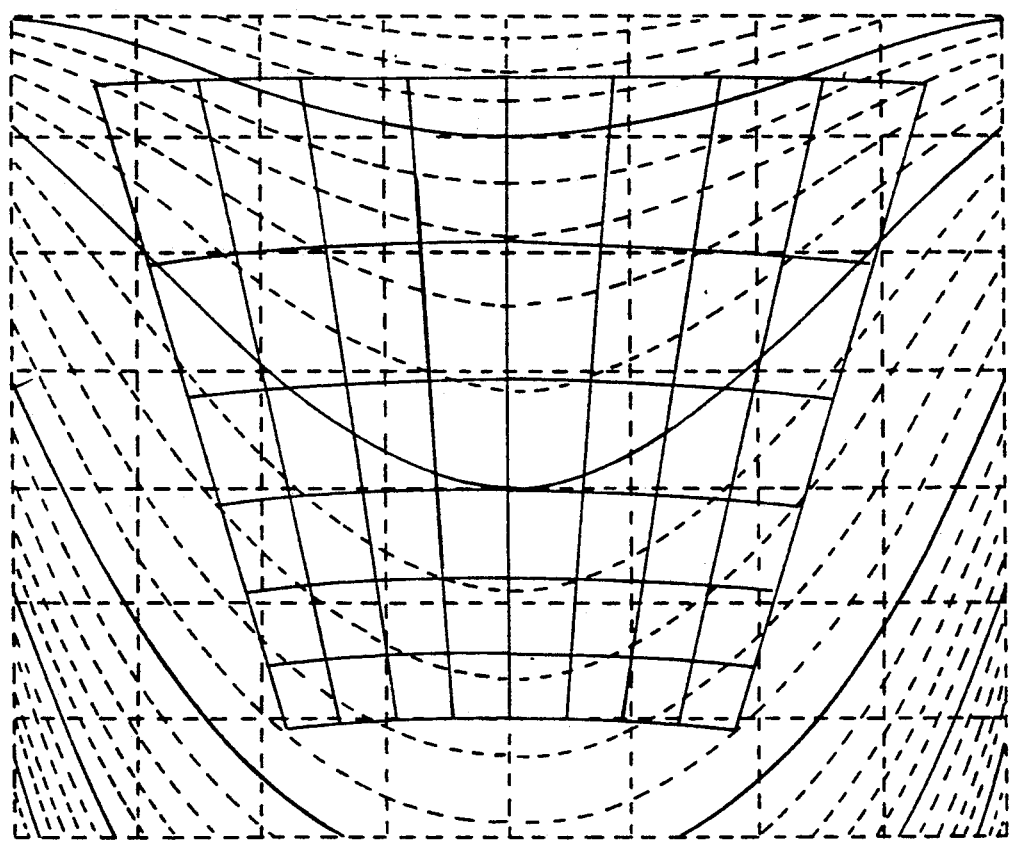
Figure 13B:
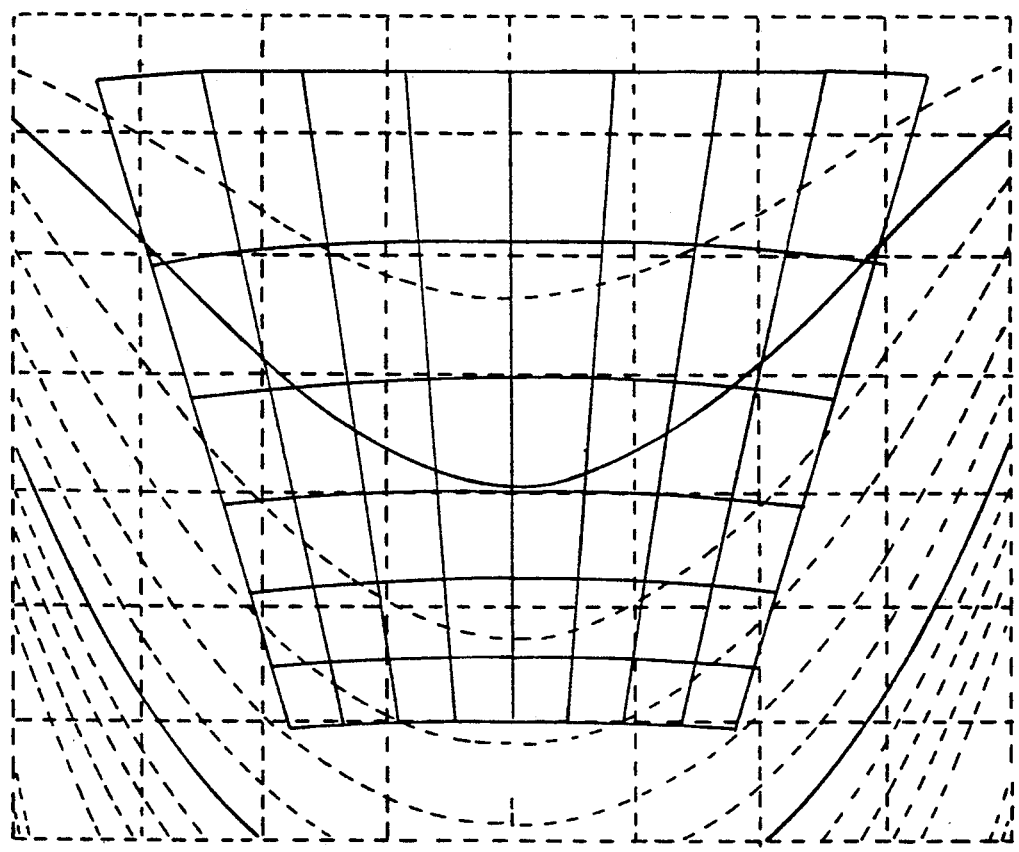

The original surface form is shown in the contour map (with spacing of 10 mm) in FIG. 13A, showing the displacement from the y-z surface. The macroscopic form surface after the Fresnel-formation is shown in the contour map (with spacing of 10 mm) of FIG. 13B, showing the displacement from the y-z surface.

Figure 13C:
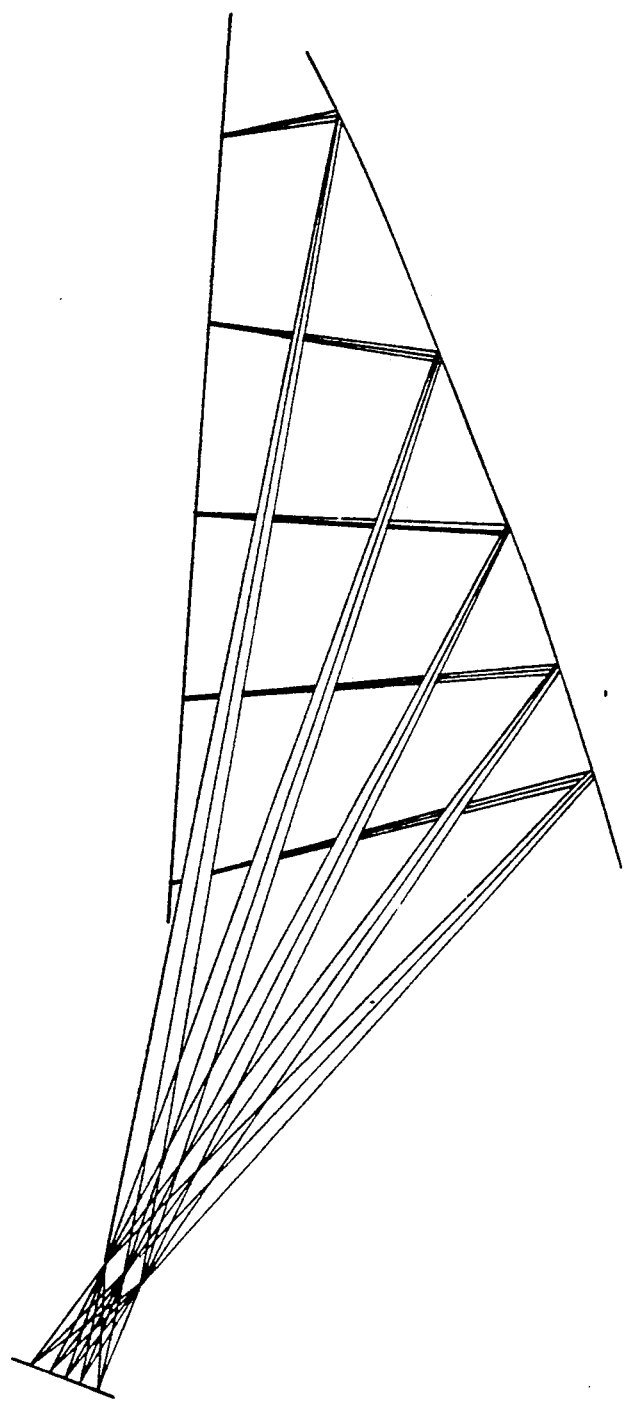
Figure 13D:
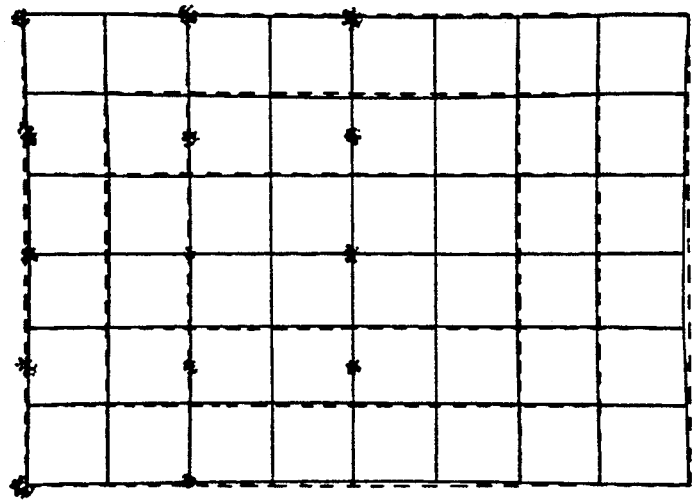
Figure 13E:
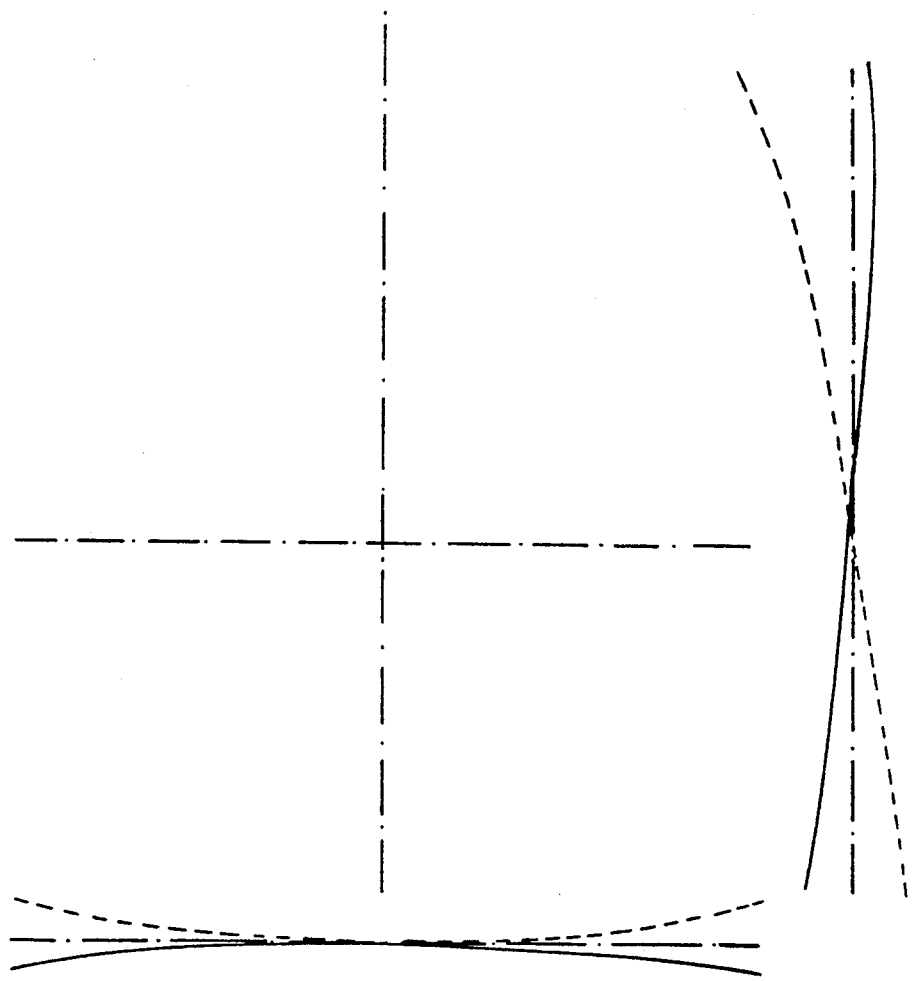

FIG. 13E shows the vertical and horizontal cross sections along the x-y surface and the x-z surface of the original surface and the microscopic form. The broken line shows the original surface, the solid line shows the macroscopic form after Fresnel-formation and the dashed line shows the y-z surface.

Figure 13F:
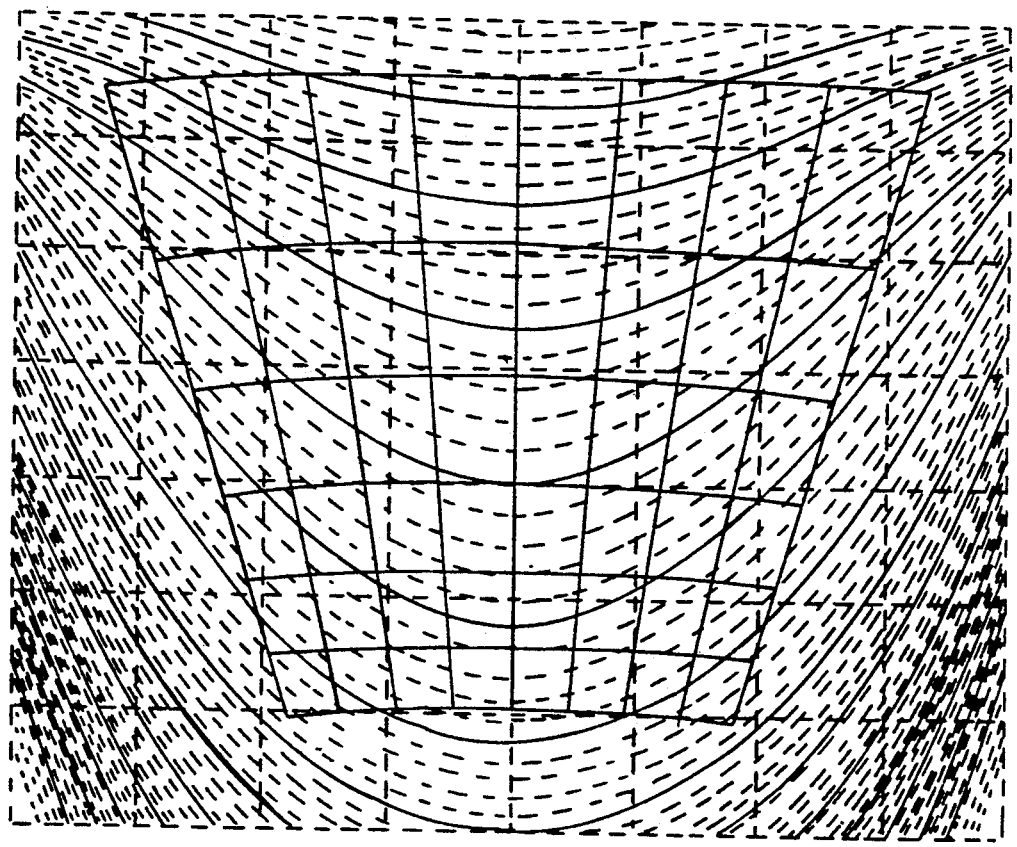

FIG. 13F shows the contour map (with a spacing of 10 mm), showing the added amount to make the original surface fit to the macroscopic form surface by using the Fresnel-formation; that is, the amount obtained by subtracting the original surface form from the macroscopic form as displacement from the y-z surface.

Table 15 shows the inclination and the distance, the symbol definitions of which are the same as those for the above embodiment. An ideal lens is assumed to have a thickness of 0 (Zero).

The light path according to the arrangement as above is shown in FIG. 13C, while the diagram of the optical image is shown in FIG. 13D. FIG. 13D simulates the spot corresponding to 100 beams from one point on the chart surface 10.

The thickness index is $d\tau = 278,269$ mm in case of this arrangement.

TABLE 15

| | |
|---|---|
| $\theta_1 = 27.000°$ | $d_1 = 82.785$ |
| $\theta_2 = 41.000°$ | $d_2 = 600.000$ |
| $\theta_3 = 4.068°$ | $d_3 = 210.000$ |

As mentioned above, in a image projector according to this invention, the Fresnel mirror which has an effect similar to a spherical mirror based on the cylinder convex surface is used. As a result, the angle of the reflecting mirror with respect to the screen could be reduced without affecting performance of the image projected on the screen. Making the device thinner is also achieved with this arrangement.

From the above embodiments, a description has been given based on simulation results in conditions in which various optical constants have been determined. It is however possible to provide different devices with the same effect as that of the embodiments described by varying constants, so long as the configuration is the same. Even in that case, as in the previous embodiments, tilting the chart surface of the image source, as in conventional examples, makes the effect of this invention further remarkable.

What is claimed is:

1. An image projecting device comprising:
    a screen that is positioned along a predetermined plane;
    a source for emitting light which forms an optical image on said screen, said source having an optical axis, wherein said optical axis of said source and said screen plane are inclined with respect to each other so that they are not optically normal with respect to each other; and
    correcting means for correcting for trapezoidal distortion of said optical image on said screen, said correcting means consisting of means for reflecting said light from said source toward said screen along another optical axis, said reflecting means being optically positioned between said screen and said source, said reflecting means having a reflecting surface with a predetermined three-dimensional shape that is adapted to correct for said trapezoidal distortion of said optical image on said screen.

2. The image projecting device of claim 1, wherein both of said optical axes lie on a plane which is orthogonal to said screen.

3. The image projecting device of claim 1, wherein said reflecting surface has a first end, a second end, a first side, and a second side, said reflecting surface being shaped to reflect said light from said source onto said screen so that the shape of said optical image on said screen is different from the shape of an optical image which would be formed on said screen if said reflecting surface was two dimensional.

4. The image projecting device of claim 1, wherein the optical axis of said image source and said screen are inclined with respect to each other by less than 45°.

5. The image projecting device of claim 1, wherein said screen is substantially vertical.

6. The image projecting device of claim 3, wherein said reflecting surface, between said first end and said second end, is generally curved, and wherein said reflecting surface between said first side and said second side is generally curved.

7. The image projecting device of claim 3, wherein said reflecting surface has a Fresnel shape.

8. The image projecting device of claim 1, further comprising a lens that is positioned proximate to said source and to said reflecting means.

9. The image projecting device of claim 1, wherein a plurality of steps are cut into said reflecting surface.

10. The image projecting device of claim 1, wherein said reflecting surface comprises a Fresnel surface.

11. The image projecting device of claim 1, wherein said reflecting surface is optically equivalent to a three-dimensional curved reflecting surface.

12. The image projecting device of claim 1, wherein said source comprises a liquid crystal display device.

13. The image projecting device of claim 8, wherein said lens comprises one of a plurality of lenses.

14. The image projecting device of claim 1, wherein said source comprises a CRT.

15. The image projecting device of claim 3, wherein said reflecting surface, between said first end and said second end, is generally curved, and wherein said reflecting surface between said first side and said second side is formed to have a Fresnel shape.

16. The image projecting device of claim 3, wherein said reflecting surface is formed to have a Fresnel shape which comprises means for forming the optical image on said screen to have a shape which is different from the shape of the optical image which would be formed on said screen if said reflecting surface was two dimensional, at least in a direction parallel to a direction viewed from said first side to said second side of said reflecting surface, wherein said reflecting surface, between said first end and said second end, is generally curved.

17. An image projecting device comprising:
 (a) a screen that is positioned along a predetermined plane;
 (b) a source for emitting light which forms an optical image on said screen, said source having an optical axis, wherein said optical axis of said source and said screen plane are inclined with respect to each other so that they are not optically normal with respect to each other; and
 (c) correcting means for correcting trapezoidal distortion of said optical image on said screen, said correcting means consisting of means for reflecting said light from said source towards said screen along another optical axis, said reflecting means being optically positioned between said screen and said source.

18. An image projecting device in accordance with claim 17, wherein said reflecting means includes a reflecting surface which comprises means for changing the size of said image on said screen by changing the size of the image reflected by said reflecting means in two directions which are perpendicular to each other.

19. An image projecting device in accordance with claim 17, wherein both of said optical axes lie in a plane which is orthogonal to said screen.

20. An image projecting device of claim 17, wherein the optical axis of said image source and said screen are inclined with respect to each other by less than 45°.

21. The image projecting device of claim 20, wherein said inclination is equal to approximately 30°.

22. The image projecting device of claim 17, wherein said reflecting surface has a Fresnel shape.

23. The image projecting device of claim 17, further comprising a lens that is positioned proximate to said source and to said reflecting means.

24. The image projecting device of claim 23, wherein said lens comprises one of a plurality of lenses.

25. The image projecting device of claim 17, wherein said screen is substantially vertical.

26. The image projecting device of claim 18, wherein a plurality of steps are cut into said reflecting surface.

27. The image projecting device of claim 18, wherein said reflecting surface is optically equivalent to a three-dimensional curved reflecting surface.

28. The image projecting device of claim 17, wherein said source comprises a liquid crystal display device.

29. The image projecting device of claim 17, wherein said source comprises a CRT.

30. The image projecting device of claim 17, wherein said reflecting means comprise means for reflecting light from said source in a non-uniform manner to correct for trapezoidal distortion.

* * * * *